(12) United States Patent
Henry et al.

(10) Patent No.: US 10,900,424 B2
(45) Date of Patent: Jan. 26, 2021

(54) SUPERCHARGER

(71) Applicant: Eaton Intelligent Power Limited, Dublin (IE)

(72) Inventors: Matthew M. Henry, Kalamazoo, MI (US); Grant S. Terry, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/362,355

(22) Filed: Mar. 22, 2019

(65) Prior Publication Data
US 2019/0301376 A1 Oct. 3, 2019

Related U.S. Application Data

(60) Provisional application No. 62/650,359, filed on Mar. 30, 2018.

(51) Int. Cl.
*F02D 23/00* (2006.01)
*B63H 20/24* (2006.01)
*F02B 37/04* (2006.01)
*F02B 33/34* (2006.01)

(52) U.S. Cl.
CPC .......... *F02D 23/005* (2013.01); *B63H 20/24* (2013.01); *F02B 33/34* (2013.01); *F02B 37/04* (2013.01)

(58) Field of Classification Search
CPC ......... B63H 20/24; B63H 20/32; F02B 33/34; F02B 37/04; F02D 23/005
See application file for complete search history.

(56) References Cited

U.S. PATENT DOCUMENTS

| | | | |
|---|---|---|---|
| 4,955,352 A | 9/1990 | Takeda | |
| 5,180,297 A * | 1/1993 | Hansen | F04C 15/0038 277/353 |
| 5,261,356 A | 11/1993 | Takahashi et al. | |
| 6,405,692 B1 | 6/2002 | Christiansen | |
| 7,247,067 B2 | 7/2007 | Mashiko | |
| 7,404,293 B2 | 7/2008 | Ozawa | |
| 7,866,966 B2 | 1/2011 | Swartzlander | |
| 9,840,972 B2 | 12/2017 | Bevan et al. | |
| 2009/0148330 A1* | 6/2009 | Swartzlander | F04C 18/16 418/196 |
| 2015/0337716 A1* | 11/2015 | Ouwenga | F01C 17/02 417/364 |

* cited by examiner

*Primary Examiner* — Brandon D Lee
(74) *Attorney, Agent, or Firm* — Dierker & Kavanaugh, P.C.

(57) ABSTRACT

A rotating group for a supercharger includes a driving shaft and rotor assembly including a driving shaft connected to a driving rotor. A driven shaft and rotor assembly include a driven shaft connected to a driven rotor. The driving rotor is in intermeshing engagement with the driven rotor to rotate in a pair of transversely overlapping cylindrical chambers defined in a rotor housing of the supercharger. A driving shaft bearing is disposed in a bottom plate to radially and axially support the driving shaft for rotating the driving rotor in the rotor housing at a first predetermined axial location of the driving rotor from the bottom plate. A driven shaft bearing is disposed in the bottom plate to radially and axially support the driven shaft for rotating the driven rotor in the rotor housing at a second predetermined axial location of the driven rotor from the bottom plate.

20 Claims, 9 Drawing Sheets

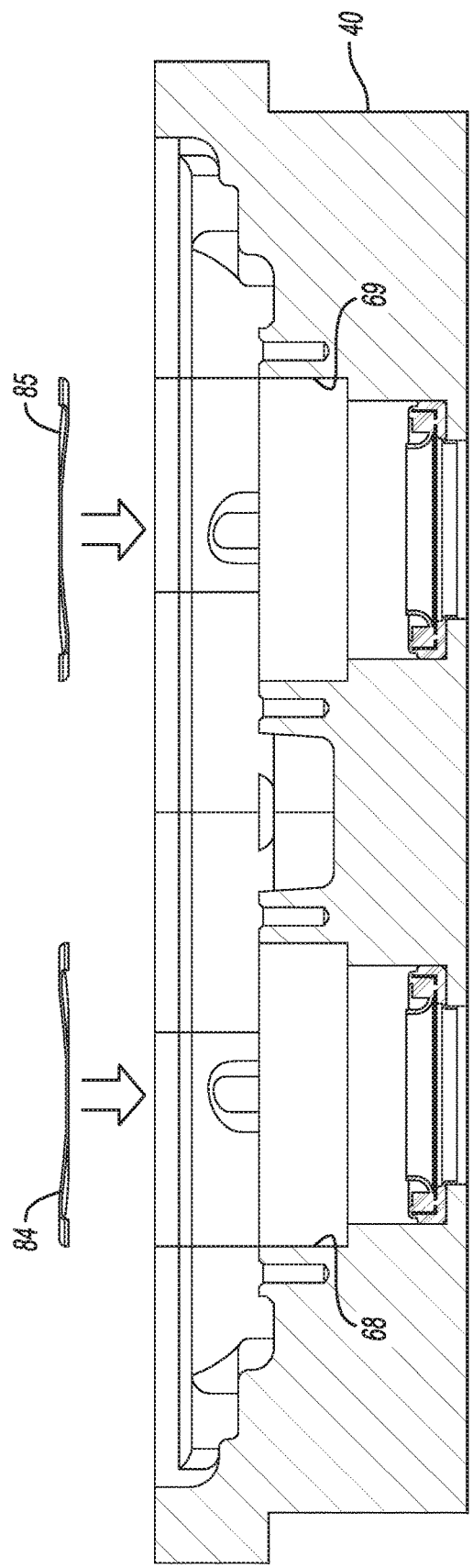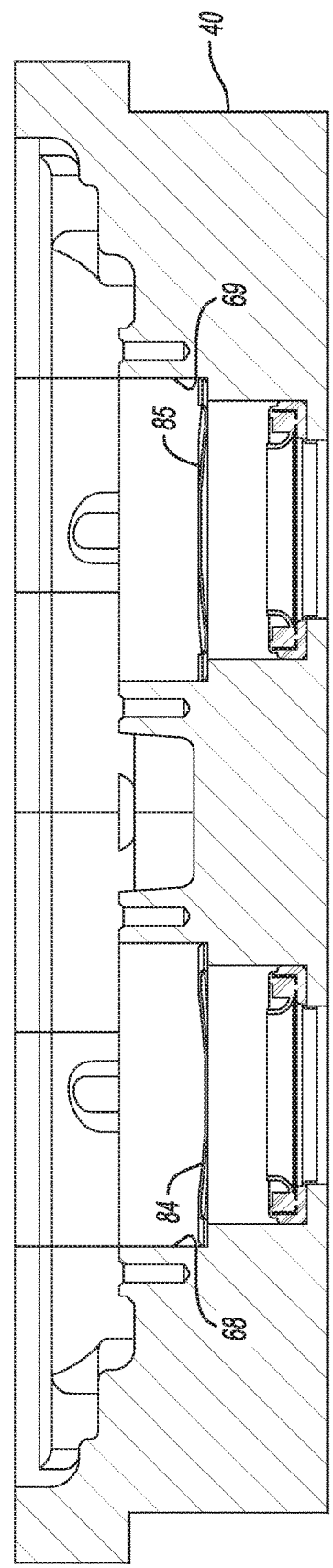
Fig-9A
Fig-9B

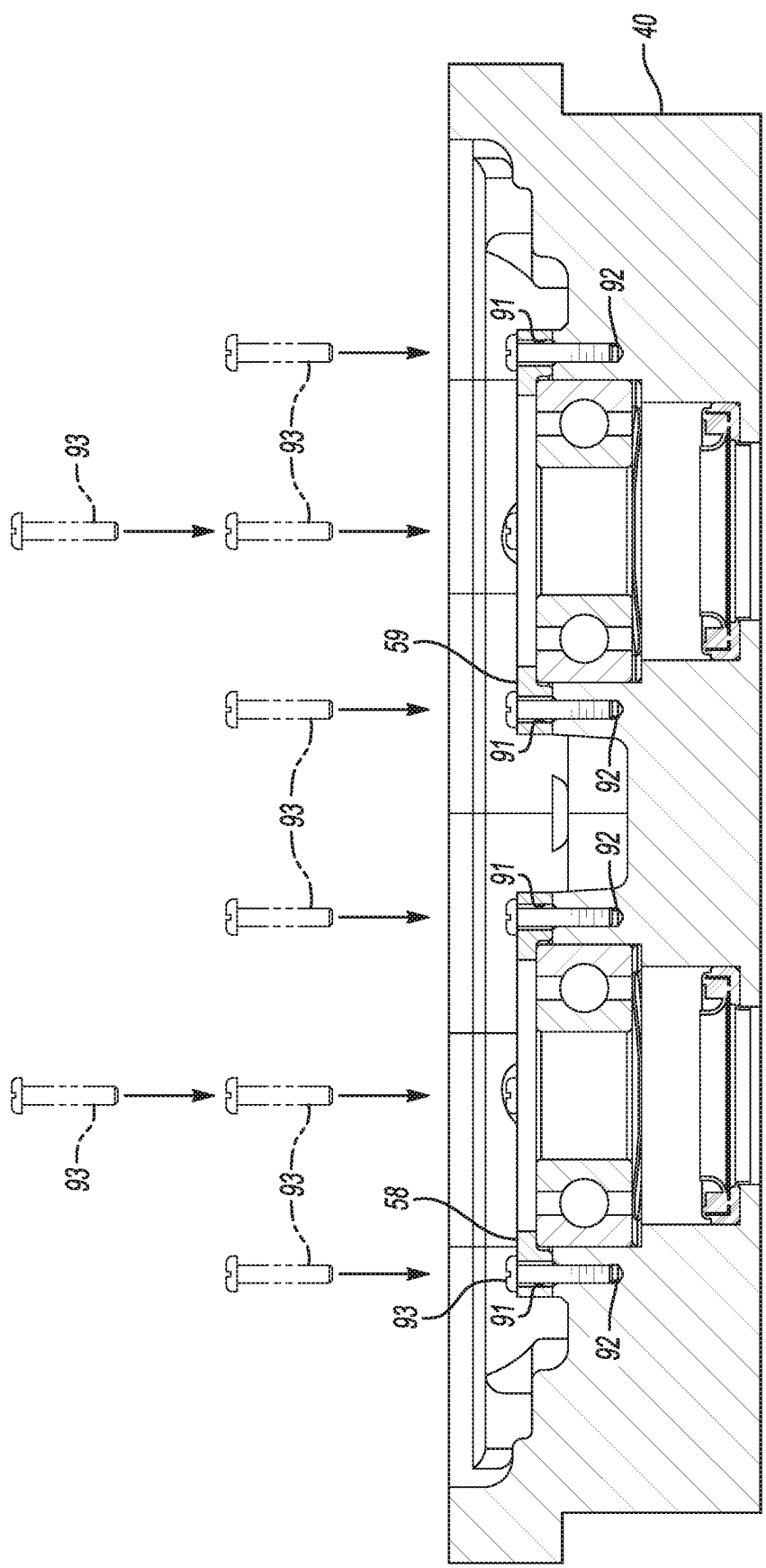

SUPERCHARGER

CROSS-REFERENCE TO RELATED APPLICATION

This application claims the benefit of U.S. provisional application Ser. No. 62/650,359, filed Mar. 30, 2018, which is incorporated herein by reference in its entirety.

BACKGROUND

Superchargers can be used to increase or "boost" the air pressure in the intake manifold of an internal combustion (IC) engine to increase the power output of the IC engine. The power output of the IC engine can thus be increased over the output power of the IC engine if the IC engine were normally aspirated (e.g., the piston would draw air at ambient atmospheric pressure into the cylinder during the intake stroke of the piston). Some IC engines are "horizontal" engines, with a crankshaft that normally turns about a horizontal axis. When a supercharger is used to boost a horizontal engine, rotating portions of the supercharger can rotate about an axis that is substantially parallel to the crankshaft. For example, the rotors of a Roots blower type of supercharger can rotate about a horizontal axis. Another type of IC engine is a "vertical" engine, with a crankshaft that normally turns about a vertical axis. Vertical engines have been used, for example, in power lawn mowers, and marine applications. It is to be understood that horizontal and vertical engines are not limited to operation with the crankshaft in a respective horizontal or vertical orientation. For example, a lawn mower with a vertical engine can be operated on a hill, and piston powered horizontal engines can be used in vehicles on steep grades or aircraft in aerobatic maneuvers.

SUMMARY

A rotating group for a supercharger includes a driving shaft and rotor assembly including a driving shaft fixedly connected to a driving rotor for rotation therewith. A driven shaft and rotor assembly include a driven shaft fixedly connected to a driven rotor for rotation therewith. The driving rotor is in intermeshing engagement with the driven rotor to rotate in a pair of transversely overlapping cylindrical chambers defined in a rotor housing of the supercharger. A driving shaft bearing is disposed in a bottom plate to radially and axially support the driving shaft for rotating the driving rotor in the rotor housing at a first predetermined axial location of the driving rotor from the bottom plate. A driven shaft bearing is disposed in the bottom plate to radially and axially support the driven shaft for rotating the driven rotor in the rotor housing at a second predetermined axial location of the driven rotor from the bottom plate.

INTRODUCTION

A first aspect disclosed herein is a rotating group for a supercharger, comprising: a driving shaft and rotor assembly including a driving shaft fixedly connected to a driving rotor for rotation therewith, a driven shaft and rotor assembly including a driven shaft fixedly connected to a driven rotor for rotation therewith, wherein the driving rotor is in intermeshing engagement with the driven rotor to rotate in a pair of transversely overlapping cylindrical chambers defined in a rotor housing of the supercharger, a driving shaft bearing disposed in a bottom plate to radially and axially support the driving shaft for rotating the driving rotor in the rotor housing at a first predetermined axial location of the driving rotor from the bottom plate; and a driven shaft bearing disposed in the bottom plate to radially and axially support the driven shaft for rotating the driven rotor in the rotor housing at a second predetermined axial location of the driven rotor from the bottom plate.

In a first example of this first aspect, the rotating group further comprises: the driving shaft having a pulley end and a timing gear end distal to the pulley end, wherein the rotor housing defines the pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical; a driving timing gear fixedly attached to the driving shaft at the timing gear end of the driving shaft; a driven timing gear meshingly engaged with the driving timing gear at the bottom end of the rotor housing; and the bottom plate disposed at a predetermined distance from a bottom face of the driving rotor, the bottom plate defining a driving side bore and a driven side bore.

In an example of this first example of the first aspect, the rotating group further comprises: a driving shaft bearing cap attached to the bottom plate in contact with a driving shaft bearing outer race to prevent downward axial movement of the driving shaft bearing relative to the bottom plate when the driving shaft bearing is subjected to axial loads from the driving shaft and rotor assembly during operation of the driving rotor when a driving rotor axis is vertical; and a driven shaft bearing cap attached to the bottom plate in contact with a driven shaft bearing outer race to prevent downward axial movement of the driven shaft bearing relative to the bottom plate when the driven shaft bearing is subjected to axial loads from the driven shaft and rotor assembly during operation of the driven rotor when a driven rotor axis is vertical.

In a further example of the first example of this first aspect, the driving side bore is a driving side stepped cylindrical bore having: a driving shaft clearance bore portion having a driving shaft clearance diameter defined by a driving shaft seal abutment flange at a driving rotor facing end of the driving side bore, the driving shaft seal abutment flange to abut a driving shaft seal cartridge; a driving shaft seal cartridge retention bore portion defined in the bottom plate, serially adjacent to the driving shaft clearance bore portion, and having a driving shaft seal cartridge retention diameter larger than the driving shaft clearance diameter to receive the driving shaft seal cartridge and prevent leakage of oil between the driving shaft seal cartridge and the driving shaft seal cartridge retention bore portion; and a driving shaft bearing retention bore portion defined in the bottom plate, serially adjacent to the driving shaft seal cartridge retention bore portion, and having a driving shaft bearing retention diameter larger than the driving shaft seal cartridge retention diameter, to receive the driving shaft bearing.

In a further example of the first example of this first aspect, the rotating group further comprises: a driving side spring reaction shoulder defined in the bottom plate at an intersection of the driving shaft seal cartridge retention bore portion and the driving shaft bearing retention bore portion; and a driving side spring disposed in the driving shaft bearing retention bore portion of the driving side bore, between the driving side spring reaction shoulder and the driving shaft bearing outer race, to urge the driving shaft bearing axially toward the driving shaft bearing cap, to prevent the driving shaft bearing from axially migrating upward, toward the driving rotor, relative to the bottom plate when the driving shaft bearing is subjected to axial loads from the driving shaft and rotor assembly during operation of the rotating group when the driving rotor axis is vertical.

In a further example of the first example of this first aspect, the driven side bore is a driven side stepped cylindrical bore having: a driven shaft clearance bore portion having a driven shaft clearance diameter defined by a driven shaft seal abutment flange at a driven rotor facing end of the driven side bore, the driven shaft seal abutment flange to abut a driven shaft seal cartridge; a driven shaft seal cartridge retention bore portion defined in the bottom plate, serially adjacent to the driven shaft clearance bore portion, and having a driven shaft seal cartridge retention diameter larger than the driven shaft clearance diameter to receive the driven shaft seal cartridge and prevent leakage of oil between the driven shaft seal cartridge and the driven shaft seal cartridge retention bore portion; and a driven shaft bearing retention bore portion defined in the bottom plate, serially adjacent to the driven shaft seal cartridge retention bore portion, and having a driven shaft bearing retention diameter larger than the driven shaft seal cartridge retention diameter, to receive the driven shaft bearing.

In a further example of the first example of this first aspect, the rotating group further comprises: a driven side spring reaction shoulder defined in the bottom plate at an intersection of the driven shaft seal cartridge retention bore portion and the driven shaft bearing retention bore portion; and a driven side spring disposed in the driven shaft bearing retention bore portion of the driven side bore, between the driven side spring reaction shoulder and the driven shaft bearing outer race, to urge the driven shaft bearing axially toward the driven shaft bearing cap, to prevent the driven shaft bearing from axially migrating upward, toward the driven rotor, relative to the bottom plate when the driven shaft bearing is subjected to axial loads from the driven shaft and rotor assembly during operation of the rotating group when the driven rotor axis is vertical.

It is to be understood that any features of the rotating group disclosed herein may be combined together in any desirable manner and/or configuration.

A second aspect disclosed herein is a supercharger, comprising: a supercharger drive pulley established at a pulley end of the supercharger, the supercharger drive pulley connected to a driving shaft for rotation therewith, the supercharger drive pulley to be rotated about a vertical axis by a connection to a top-mounted crankshaft pulley of a vertical crankshaft engine; a rotor housing defining a pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical; an air intake opening defined in the rotor housing at the top end; a driving timing gear fixedly attached to the driving shaft at the timing gear end of the driving shaft; and a driven timing gear meshingly engaged with the driving timing gear at the bottom end of the rotor housing.

In a first example of this second aspect, the supercharger further comprises: a driving shaft and rotor assembly including a driving shaft fixedly connected to a driving rotor for rotation therewith; a driven shaft and rotor assembly including a driven shaft fixedly connected to a driven rotor for rotation therewith, wherein the driving rotor is in intermeshing engagement with the driven rotor to rotate in the pair of transversely overlapping cylindrical chambers; a bottom plate disposed at the bottom end of the rotor housing, the bottom plate defining a driving side bore and a driven side bore; a driving shaft bearing disposed in the driving side bore to radially and axially support the driving shaft for rotating the driving rotor in the rotor housing at a first predetermined axial location of the driving rotor in the rotor housing; and a driven shaft bearing disposed in the driven side bore to radially and axially support the driven shaft for rotating the driven rotor in the rotor housing at a second predetermined axial location of the driven rotor in the rotor housing.

In an example of the first example of this second aspect, the supercharger further comprises: a driving shaft bearing cap attached to the bottom plate in contact with a driving shaft bearing outer race to prevent downward axial movement of the driving shaft bearing relative to the bottom plate when the driving shaft bearing is subjected to axial loads from the driving shaft and rotor assembly during operation of the supercharger when a driving rotor axis is vertical; and a driven shaft bearing cap attached to the bottom plate in contact with a driven shaft bearing outer race to prevent downward axial movement of the driven shaft bearing relative to the bottom plate when the driven shaft bearing is subjected to axial loads from the driven shaft and rotor assembly during operation of the supercharger when a driven rotor axis is vertical.

In a further example of the first example of this second aspect, the driving side bore is a driving side stepped cylindrical bore having: a driving shaft clearance bore portion having a driving shaft clearance diameter defined by a driving shaft seal abutment flange at a driving rotor facing end of the driving side bore, the driving shaft seal abutment flange to abut a driving shaft seal cartridge; a driving shaft seal cartridge retention bore portion defined in the bottom plate, serially adjacent to the driving shaft clearance bore portion, and having a driving shaft seal cartridge retention diameter larger than the driving shaft clearance diameter to receive the driving shaft seal cartridge and prevent leakage of oil between the driving shaft seal cartridge and the driving shaft seal cartridge retention bore portion; and a driving shaft bearing retention bore portion defined in the bottom plate, serially adjacent to the driving shaft seal cartridge retention bore portion, and having a driving shaft bearing retention diameter larger than the driving shaft seal cartridge retention diameter, to receive the driving shaft bearing.

In a further example of the first example of this second aspect, the supercharger further comprises: a driving side spring reaction shoulder defined in the bottom plate at an intersection of the driving shaft seal cartridge retention bore portion and the driving shaft bearing retention bore portion; and a driving side spring disposed in the driving shaft bearing retention bore portion of the driving side bore, between the driving side spring reaction shoulder and the driving shaft bearing outer race, to urge the driving shaft bearing axially toward the driving shaft bearing cap, to prevent the driving shaft bearing from axially migrating upward, toward the driving rotor, relative to the bottom plate when the driving shaft bearing is subjected to axial loads from the driving shaft and rotor assembly during operation of the supercharger when the driving rotor axis is vertical.

In a further example of the first example of this second aspect, the driven side bore is a driven side stepped cylindrical bore having: a driven shaft clearance bore portion having a driven shaft clearance diameter defined by a driven shaft seal abutment flange at a driven rotor facing end of the driven side bore, the driven shaft seal abutment flange to abut a driven shaft seal cartridge; a driven shaft seal cartridge retention bore portion defined in the bottom plate, serially adjacent to the driven shaft clearance bore portion, and having a driven shaft seal cartridge retention diameter larger than the driven shaft clearance diameter to receive the driven shaft seal cartridge and prevent leakage of oil between the driven shaft seal cartridge and the driven shaft seal cartridge retention bore portion; and a driven shaft bearing retention bore portion defined in the bottom plate, serially adjacent to the driven shaft seal cartridge retention bore portion, and having a driven shaft bearing retention diameter larger than the driven shaft seal cartridge retention diameter, to receive the driven shaft bearing.

In a further example of the first example of this second aspect, the supercharger further comprises: a driven side spring reaction shoulder defined in the bottom plate at an intersection of the driven shaft seal cartridge retention bore portion and the driven shaft bearing retention bore portion; and a driven side spring disposed in the driven shaft bearing retention bore portion of the driven side bore, between the driven side spring reaction shoulder and the driven shaft bearing outer race, to urge the driven shaft bearing axially toward the driven shaft bearing cspap, to prevent the driven shaft bearing from axially migrating upward, toward the driven rotor, when the driven shaft bearing is subjected to axial loads from the driven shaft and rotor assembly during operation of the supercharger when the driven rotor axis is vertical.

It is to be understood that any features of the supercharger disclosed herein may be combined together in any desirable manner and/or configuration.

A third aspect disclosed herein is an outboard motor for a watercraft, comprising: an internal combustion engine having a vertical crankshaft and a top-mounted crankshaft pulley; a supercharger, including: a supercharger drive pulley established at a pulley end of the supercharger, the supercharger drive pulley connected to a driving shaft for rotation therewith, the supercharger drive pulley to be rotated about a vertical axis by a connection to the top-mounted crankshaft pulley of the internal combustion engine; a rotor housing defining a pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical; an air intake opening defined in the rotor housing at the top end; a driving timing gear fixedly attached to the driving shaft at the timing gear end of the driving shaft; and a driven timing gear meshingly engaged with driving timing gear at the bottom end of the rotor housing.

It is to be understood that any features of the outboard motor disclosed herein may be combined together in any desirable manner and/or configuration.

Further, it is to be understood that any combination of features of any aspect of the rotating group and/or of any aspect of the supercharger and/or of any aspect of the outboard motor may be used and/or combined together in any desirable manner, and/or may be used and/or combined with any of the examples disclosed herein.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 9A and FIG. 9B are cross-sectional views together depicting an example of inserting of the driving side spring and the driven side spring into the bottom plate as disclosed herein;

FIG. 11 is a cross-sectional view depicting an example of installation of bearing cap retention bolts.

DETAILED DESCRIPTION

Figure 1:
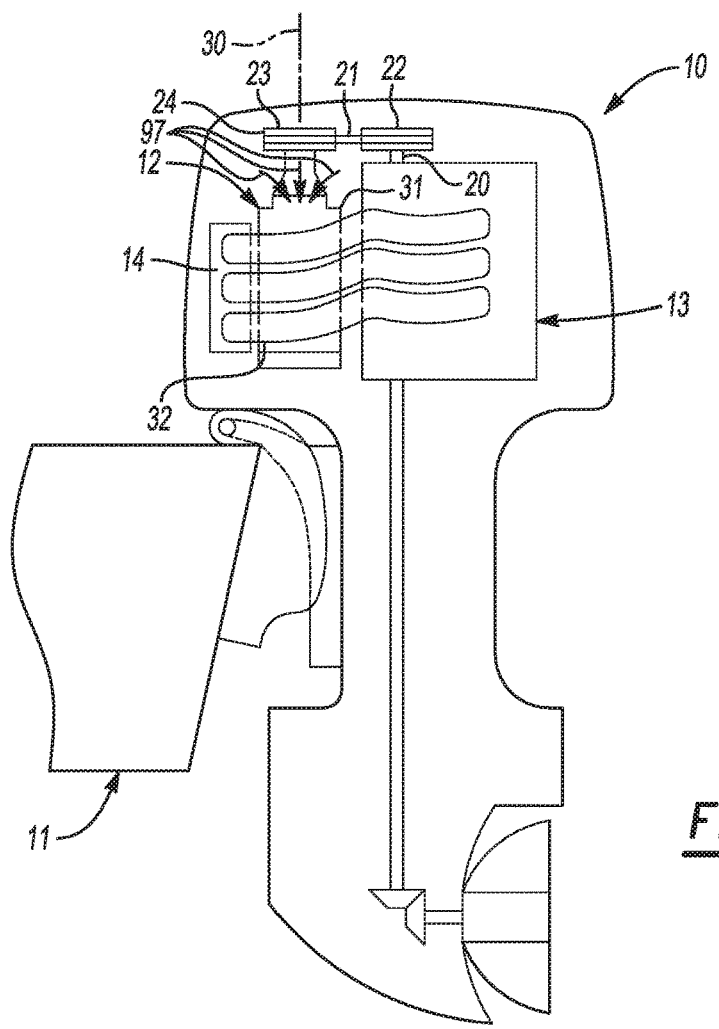
FIG. 1 is a semi-schematic side view of an outboard motor including a supercharger according to an example of the present disclosure.

The present disclosure relates generally to a supercharger assembly and more specifically to a supercharger assembly for an outboard motor for a watercraft.

Some watercraft may be propelled by internal combustion engines connected to a propeller or jet propulsion system. As used herein, the term "watercraft" means a boat or other vessel with propulsive capability that travels on water. Non-limiting examples of watercraft include ships, boats, hovercraft, and jet skis. Some watercraft have inboard engines mounted in an engine compartment or engine room inside the hull of the vessel. Other watercraft may be propelled by outboard motors. An outboard motor is a propulsion system for a watercraft that is a self-contained unit that includes engine, gearbox and propeller or jet drive, that is to be attached to an outside of a hull of the watercraft. Typically, an outboard motor is attached to a transom on an aft wall of a boat.

In some existing outboard motors with superchargers, the supercharger has timing gears at the top of the supercharger near the pulley, and air is taken into the existing supercharger at the bottom. This arrangement leads to packaging inefficiencies to route fresh air into the supercharger. Further, since lubrication for the timing gears is above the rotors, gravity urges any oil that may seep past shaft seals toward the pumping chambers and rotors. In sharp contrast, the present disclosure includes a vertical supercharger with timing gears located at the bottom, below the pumping chambers and rotors. The present disclosure includes a vertical supercharger with an air intake at the top, pulley end of the supercharger.

In some existing superchargers, particularly existing superchargers mounted such that the rotor shafts are horizontal, axial loads on the bearings that support the rotor shafts may be relatively low compared to axial loads on the driving shaft bearing 54 and the driven shaft bearing 55 of the supercharger with vertical shafts for an outboard motor as disclosed herein. Axial loads encountered by the vertically mounted supercharger 12 of the present disclosure may include at least a portion of the weight of the shaft and rotor assemblies amplified by vertical impact and vibration of the watercraft as the watercraft encounters waves on the surface of the water navigated by the watercraft. Resonances, for example from engine vibration, may also contribute to the axial loads. In existing superchargers, over time, such axial loads may urge the shaft to move axially in the bearings and the bearings to move axially in the bearing bores, even if the bearings are installed with a press. Such axial relocation of the shafts and bearings may, in turn, move the rotors from their optimal predetermined locations and lead to premature wear of the rotors and a loss of efficiency in existing superchargers. Such axial relocation of the shafts and bearings may also, in some cases, lead to contact between the rotors and the end plates of the rotor housing, potentially rendering such existing superchargers inoperative. Examples of the present disclosure may keep the rotors at their predetermined locations under loads that have been without countermeasures or previously unknown in superchargers.

FIG. 1 is a semi-schematic view of an outboard motor 10 including a supercharger 12 according to an example of the present disclosure. Examples of the present disclosure may include an outboard motor 10 for a watercraft 11. The outboard motor 10 may include an internal combustion engine 13 and a supercharger 12 to boost or supercharge the air flowing into a combustion chamber (not shown) of the internal combustion engine 13. The internal combustion engine 13 may have a vertical crankshaft 20 and a top-mounted crankshaft pulley 22 as depicted in FIG. 1.

The supercharger 12 may be connected to an intake manifold 14 for an internal combustion engine 13. The internal combustion engine 13 may include a plurality of cylinders and a corresponding number of reciprocating pistons disposed within each cylinder, thereby defining expandable combustion chambers. The internal combustion engine 13 may include an intake manifold 14 for directing combustion gas to the combustion chamber by way of intake valve(s); and an exhaust manifold assembly for directing combustion gas from the combustion chamber by way of exhaust valve(s). The internal combustion engine 13 depicted in the drawings of the present disclosure is a V-6 engine, however, it is to be understood that the present disclosure may be applied to engines with other configurations such as V-8 and inline 4 cylinder engines. In examples of the present disclosure, the internal combustion engine 13 may have any suitable number of cylinders in any suitable arrangement as long as the crankshaft of the engine normally turns about a vertical axis as stated above.

Figure 3:
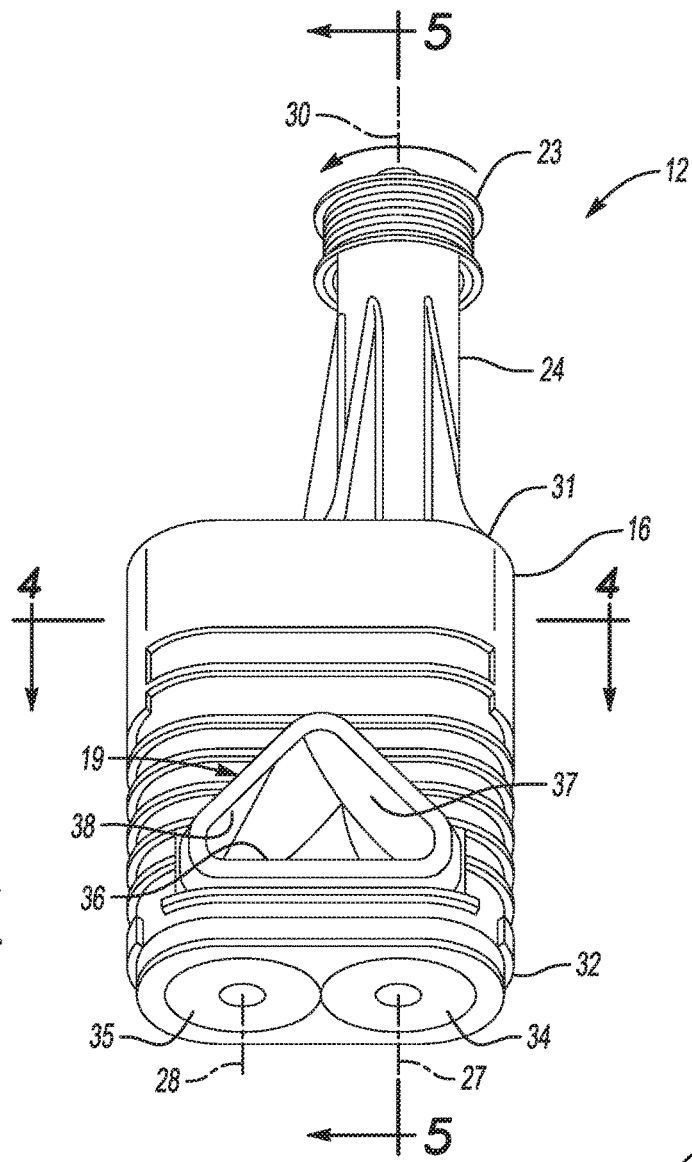
FIG. 3 is front-lower perspective view of the supercharger depicted in FIG. 1.
Figure 4:
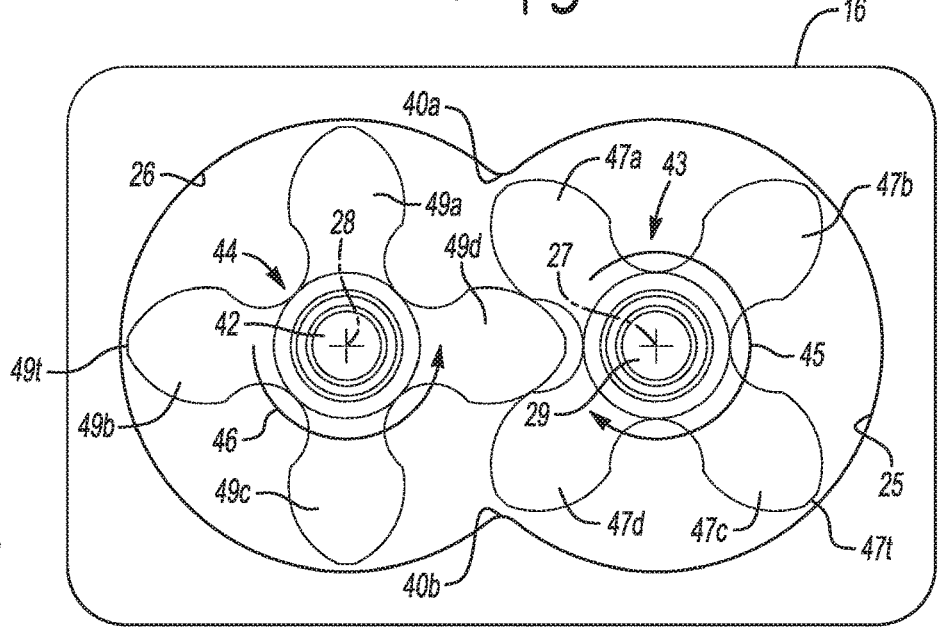
FIG. 4 is a cross-sectional view taken along line 4-4 as indicated in FIG. 3.
Figure 5:
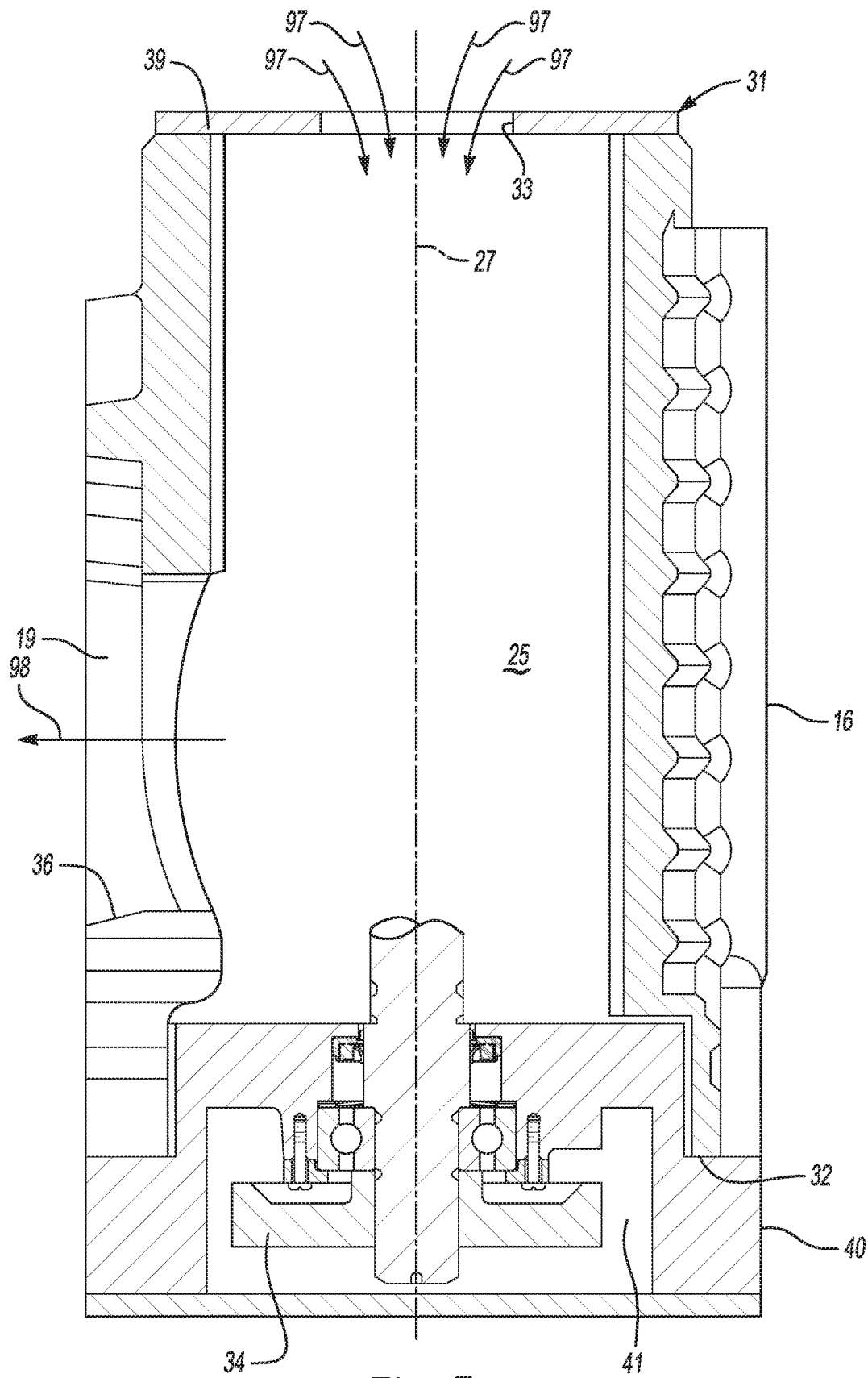
FIG. 5 is a cross-sectional view taken along line 5-5 as indicated in FIG. 3.

Referring also to FIGS. 3, 4, and 5, the supercharger 12 may be any positive displacement pump, including a Roots blower supercharger but is not necessarily limited thereto. The supercharger 12 may be a screw compressor or any other type of positive displacement pump. In accordance with an example of the present disclosure, the supercharger 12 may include a plurality (e.g., pair) of rotors 43, 44, each having a plurality of meshed lobes. The rotors may be disposed in a plurality of parallel, transversely overlapping cylindrical chambers 25, 26 and may be driven by engine crankshaft torque transmitted thereto (e.g., via a drive belt 21). The supercharger 12 may include a rotor housing 16 that may define the plurality of parallel, transversely overlapping cylindrical chambers 25, 26. The mechanical drive of the supercharger 12, including driving shaft 29, may rotate the rotors 43, 44 at a fixed ratio, relative to the crankshaft speed, such that the displacement of the supercharger 12 is greater than the engine displacement, thereby boosting or supercharging the air flowing into the combustion chamber of the internal combustion engine 13. The supercharger 12 may include an inlet port configured to receive air from an inlet duct or passage and an outlet port configured to direct charged air to the intake valves via a discharge duct that may include a charge air cooler or intercooler to lower a temperature of the intake charge air. The inlet duct or passage and the discharge duct may be interconnected by means of a bypass passage. A bypass valve may be disposed within the bypass passage and may be configured to be moved between an open position and a closed position by means of an actuator assembly.

In examples of the present disclosure, a supercharger drive pulley 23 may be established at a pulley end 24 of the supercharger 12. The supercharger drive pulley 23 may be connected to a driving shaft 29 for rotation therewith. For example, the supercharger drive pulley 23 may be pressed onto the driving shaft 29. Splines or keyways may be included at the connection between the supercharger drive pulley 23 and the driving shaft 29 to prevent rotational slippage. The supercharger drive pulley 23 is to be rotated about a vertical axis 30 by a connection to the top-mounted crankshaft pulley 22 of the internal combustion engine 13.

Figure 2:
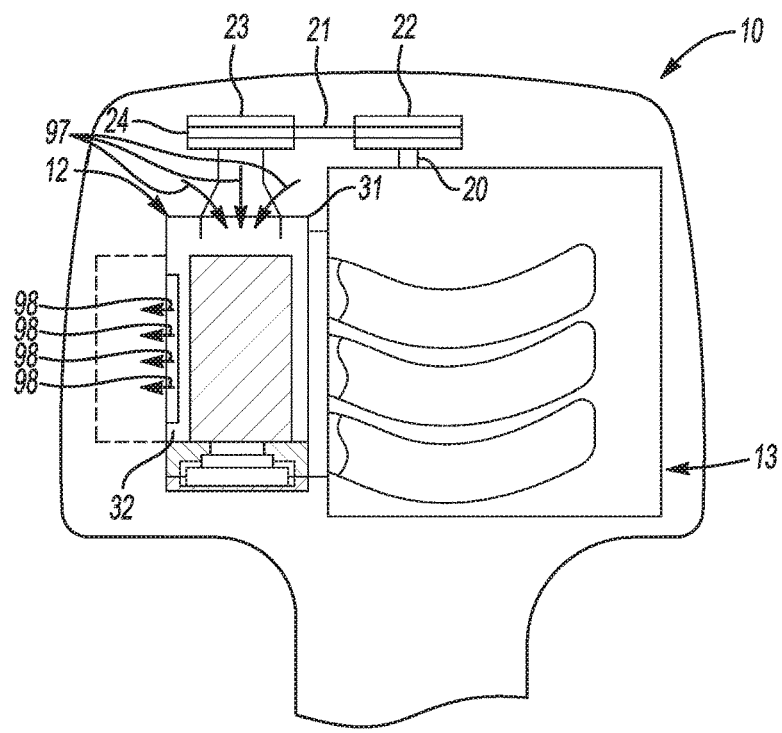
FIG. 2 is a semi-schematic side view of a powerhead portion of the outboard motor depicted in FIG. 1.
Figure 6:
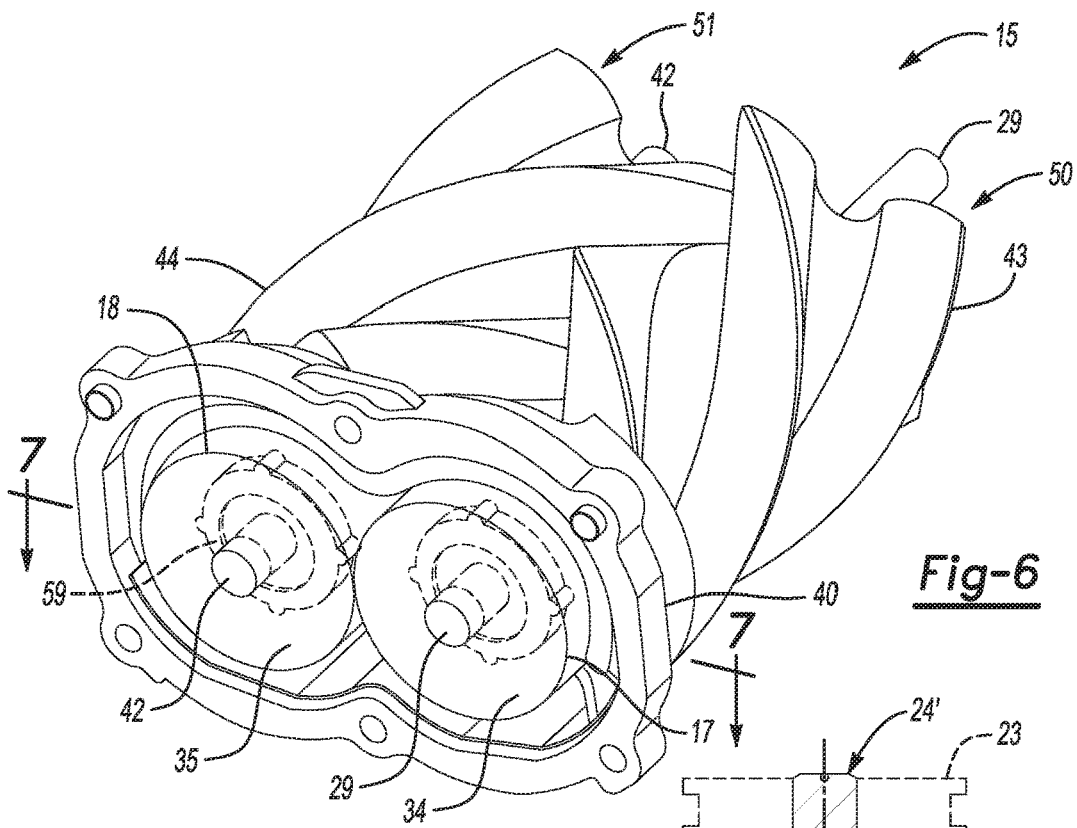
FIG. 6 is a perspective view of a rotating group from the supercharger depicted in FIG. 1 according to the present disclosure.
Figure 7:
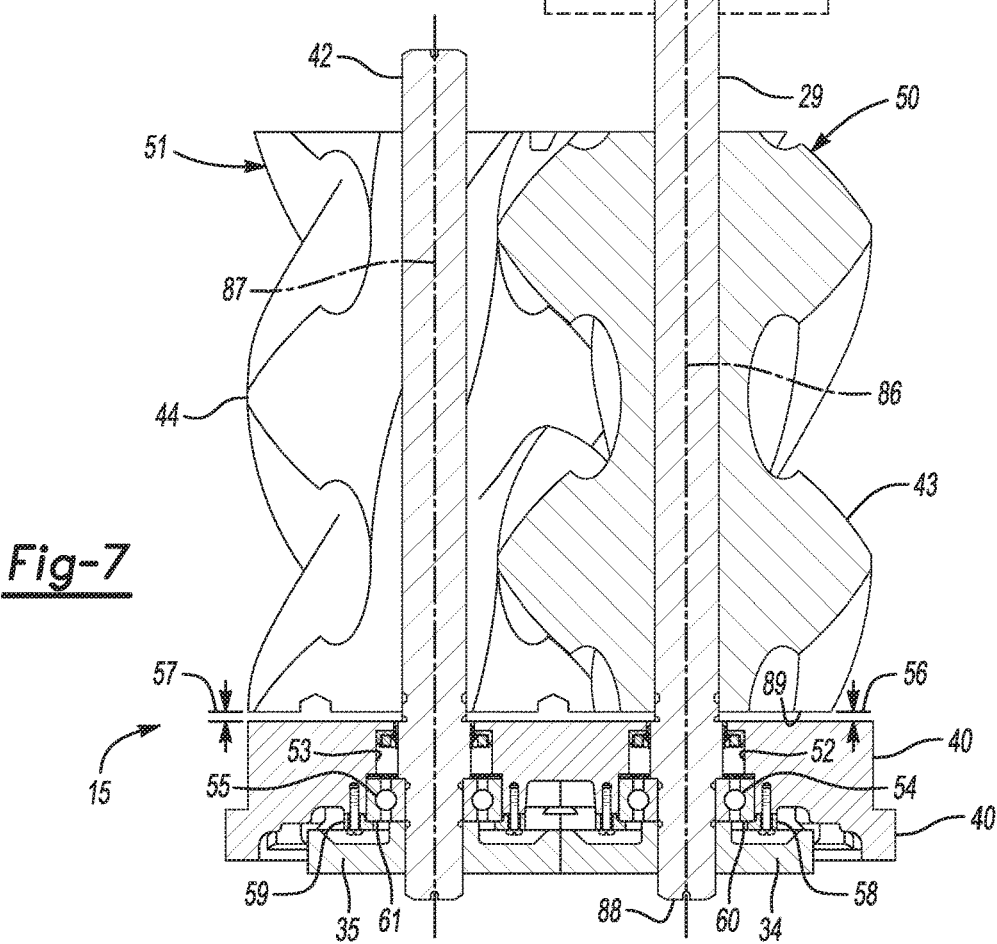
FIG. 7 is a cross-sectional view taken along line 7-7 as indicated in FIG. 6.

The supercharger 12 may include a rotor housing 16 defining a pair of transversely overlapping cylindrical chambers 25, 26 with parallel cylindrical axes 27, 28, the rotor housing 16 having a top end 31 and a bottom end 32 distal to the top end 31. The top end 31 is facing the pulley end 24. The parallel cylindrical axes 27, 28 intersect the top end 31 and the bottom end 32. The top end 31 and the bottom end 32 are defined with respect to the rotor housing 16 when the parallel cylindrical axes 27, 28 are vertical as depicted in FIG. 3. An air intake opening 33 (see FIG. 5) is defined in the rotor housing 16 at the top end 31. Supercharger intake air flow is indicated by arrows at reference numeral 97 in FIG. 1, FIG. 2 and FIG. 5. A driving timing gear 34 is fixedly attached to the driving shaft 29 at a timing gear end 88 of the driving shaft 29. A driven timing gear 35 is meshingly engaged with a driving timing gear 34 at the bottom end 32 of the rotor housing 16. As shown in FIG. 6 and FIG. 7, the driving timing gear 34 and the driven timing gear 35 are shown semi-schematically. The driving timing gear pitch circle 17 and the driven timing gear pitch circle 18 are shown in FIG. 6. It is to be understood that the driving timing gear 34 and the driven timing gear 35 have intermeshing teeth that are not shown in FIG. 6 and FIG. 7. It is to be understood that the driving timing gear 34 and the driven timing gear 35 are located outside of and below the pair of transversely overlapping cylindrical chambers 25, 26.

The rotor housing 16 also defines an outlet port 19, which, as may best be seen in FIG. 3, is substantially triangular, including an end surface 36 which is horizontal when cylindrical axis 27 is vertical, and a pair of side surfaces 37 and 38. Supercharger output air flow is indicated by arrows at reference numeral 98 in FIG. 2 and FIG. 5.

Referring now primarily to FIG. 4, in conjunction with FIG. 3 and FIG. 5, the rotor housing 16 defines a pair of transversely overlapping cylindrical chambers 25 and 26, such that in FIG. 5, the section view is through the chamber 25 looking toward the chamber 26. In FIG. 4, the chamber 25 is the right hand chamber, FIG. 4 being a view taken from the top end 31 of the rotor housing (i.e. looking down). The transversely overlapping cylindrical chambers 25 and 26 overlap at an inlet cusp 40a (which is in-line with air intake opening 33), and overlap at an outlet cusp 40b (which is in-line with, and actually is interrupted by, the outlet port 19).

Still referring primarily to FIG. 4, it may be seen that the driving rotor 43 is disposed within the cylindrical chamber 25. The driven rotor 44 is disposed within the cylindrical chamber 26. The driving rotor 43 is fixed relative to the driving shaft 29 and the driven rotor 44 is fixed relative to a driven shaft 42. The present disclosure may be utilized in connection with rotor lobes of any type, no matter how formed, and in connection with any suitable manner of mounting the rotors to the rotor shafts.

In examples of the present disclosure, and by way of example only, the driving rotor 43 and the driven rotor 44 each have a plurality N of lobes. In FIG. 4, the lobes of driving rotor 43 are generally designated 47, and the lobes of driven rotor 44 are generally designated 49. In the example depicted in FIG. 4, the plurality N is illustrated to be equal to 4, such that the driving rotor 43 includes lobes 47a, 47b, 47c, and 47d. In the same manner, the driven rotor 44 includes lobes 49a, 49b, 49c, and 49d. It is to be understood that the plurality N of lobes may be any whole number of lobes.

When viewing the rotors from the top end 31 of the rotor housing 16 as in FIG. 4, the driving rotor 43 rotates clockwise as indicated by curved arrow 45, while the driven rotor 44 rotates counterclockwise as indicated by curved arrow 46. As stated above, the air intake opening 33 (see FIG. 5) passes through the top end wall 39 defined at the top end 31 of the rotor housing 16. Therefore, air which flows into the transversely overlapping cylindrical chambers 25 and 26 through the air intake opening 33 will flow into, for example, a control volume defined between the lobes 47a and 47b, or between the lobes 49a and 49b, and the air contained in those control volumes will be carried by their respective lobes, and in their respective directions around the chambers 25 and 26, respectively, until those particular control volumes are in communication with the outlet port 19. Each of the lobes 47 includes a top land 47t, and each of the lobes 49 includes a top land 49t, the top lands 47t and 49t sealingly cooperate with the cylindrical chambers 25 and 26, respectively.

Referring now primarily to FIG. 5, in conjunction with FIG. 6 and FIG. 7, the rotor housing 16 defines a top end wall 39 through which passes the air intake opening 33, and therefore, the top end wall 39 is referenced as "defining" the air intake opening 33. At the bottom end 32, the rotor housing 16 defines a bottom plate 40 which separates transversely overlapping cylindrical chambers 25 and 26 from a gear chamber 41. The gear chamber 41 contains the driving timing gear 34 and the driven timing gear 35. The driving timing gear 34 is shown in FIG. 5.

Referring to FIG. 6 and FIG. 7, in examples of the present disclosure, the driving timing gear 34 is meshingly engaged with the driven timing gear 35. The driving timing gear 34 is connected to the driving rotor 43 via the driving shaft 29.

The driven timing gear 35 is connected to the driven rotor 44 via the driven shaft 42. The driving timing gear 34 and the driven timing gear 35 may include an equal number of gear teeth spaced at a relatively high tooth pitch. For example, the driving timing gear 34 and the driven timing gear 35 may each have 30 teeth for meshing engagement with one another; therefore the driving timing gear 34 and the driven timing gear 35 rotate with a substantially equal angular speed therebetween. As such, the driving timing gear 34 and the driven timing gear 35 substantially synchronize the driving rotor 43 and the driven rotor 44, thereby contributing to a low wear rate of the driving rotor 43 and the driven rotor 44 and high efficiency of the supercharger 12.

Referring to FIG. 3 and FIG. 7 together, in examples of the present disclosure, a supercharger 12 includes a supercharger drive pulley 23 established at a pulley end 24 of the supercharger 12. The supercharger drive pulley 23 may be connected to a driving shaft 29 for rotation therewith. The supercharger drive pulley 23 is to be rotated about a vertical axis 30 by a connection to a top-mounted crankshaft pulley 22 of a vertical crankshaft engine 13. (See FIG. 1.) In the present disclosure, the vertical crankshaft engine 13 is also called the internal combustion engine 13. The supercharger 12 includes a rotor housing 16 defining a pair of transversely overlapping cylindrical chambers 25, 26 (see FIG. 4) with parallel cylindrical axes 27, 28. The rotor housing 16 may have a top end 31 and a bottom end 32 distal to the top end 31. The top end 31 faces the pulley end 24. In other words, the top end 31 is on the same end of the rotor housing 16 as the supercharger drive pulley 23. The parallel cylindrical axes 27, 28 intersect the top end 31 and the bottom end 32. The top end 31 and the bottom end 32 are defined with respect to the rotor housing 16 when the parallel cylindrical axes 27, 28 are vertical. It is to be understood that, as used herein, the top end 31 is above the bottom end 32 when the parallel cylindrical axes 27, 28 are vertical; thus the orientation of the supercharger 12 with respect to the parallel cylindrical axes 27, 28 when vertical is unique and definite. An air intake opening 33 is defined in the rotor housing 16 at the top end 31. A driving timing gear 34 is meshingly engaged with a driven timing gear 35 at the bottom end 32.

The supercharger 12 further includes a driving shaft and rotor assembly 50 that includes a driving shaft 29 fixedly connected to a driving rotor 43 for rotation therewith in examples of the present disclosure. The supercharger 12 still further includes a driven shaft and rotor assembly 51 including a driven shaft 42 fixedly connected to a driven rotor 44 for rotation therewith, wherein the driving rotor 43 is in intermeshing engagement with the driven rotor 44 to rotate in the pair of transversely overlapping cylindrical chambers 25, 26 (see FIG. 4). A bottom plate 40 may be disposed at the bottom end 32 of the rotor housing 16. The bottom plate 40 defines a driving side bore 52 and a driven side bore 53. A driving shaft bearing 54 is disposed in the driving side bore 52 to radially and axially support the driving shaft 29 for rotating the driving rotor 43 in the rotor housing 16 at a first predetermined axial location 56 of the driving rotor 43 in the rotor housing 16. A driven shaft bearing 55 is disposed in the driven side bore 53 to radially and axially support the driven shaft 42 for rotating the driven rotor 44 in the rotor housing 16 at a second predetermined axial location 57 of the driven rotor 44 in the rotor housing 16. It is to be understood that the words "first" and "second" are used to distinguish the names of the predetermined axial locations 56, 57; therefore, "first" and "second" convey no temporal significance in this context. It is to be understood that the gap between the driving rotor 43 and the bottom plate 40 is shown at an enlarged size for clarity in FIG. 7 and FIG. 12. The driving rotor 43 and the bottom plate 40 are spaced apart to prevent contact; however, the gap is small. Similarly, the gap between the driven rotor 44 and the bottom plate 40 is shown at an enlarged size for clarity in FIG. 7 and FIG. 12. The driving rotor 43 and the bottom plate 40 are spaced to prevent contact; however, the gap is small.

In examples of the present disclosure, the supercharger 12 may include a driving shaft bearing cap 58 attached to the bottom plate 40 in contact with a driving shaft bearing outer race 60 to prevent downward axial movement of the driving shaft bearing 54 relative to the bottom plate 40 when the driving shaft bearing 54 is subjected to axial loads from the driving shaft and rotor assembly 50 during operation of the supercharger 12 when the driving rotor axis 86 is vertical. In other words, downward axial movement of the driving shaft bearing 54 is movement of the driving shaft bearing 54 along the driving rotor axis 86 in a direction that would move the driving shaft bearing 54 out of the driving shaft bearing retention bore portion 68. The driving rotor 43 rotates about the driving rotor axis 86. The cylindrical chamber 25 defines cylindrical axis 27. The driving rotor 43 is coaxial with the cylindrical chamber 25. Therefore, the driving rotor axis 86 is also the cylindrical axis 27. The supercharger 12 may also include a driven shaft bearing cap 59 attached to the bottom plate 40 in contact with a driven shaft bearing outer race 61 to prevent downward axial movement of the driven shaft bearing 55 relative to the bottom plate 40 when the driven shaft bearing 55 is subjected to axial loads from the driven shaft and rotor assembly 51 during operation of the supercharger 12 when the driven rotor axis 87 is vertical. In other words, downward axial movement of the driven shaft bearing 55 is movement of the driven shaft bearing 55 along the driven rotor axis 87 in a direction that would move the driven shaft bearing 55 out of the driven shaft bearing retention bore portion 69. The driven rotor 44 rotates about the driven rotor axis 87. The cylindrical chamber 26 defines cylindrical axis 28. The driven rotor 44 is coaxial with the cylindrical chamber 26; therefore the driven rotor axis 87 is also the cylindrical axis 28.

Figure 8A:
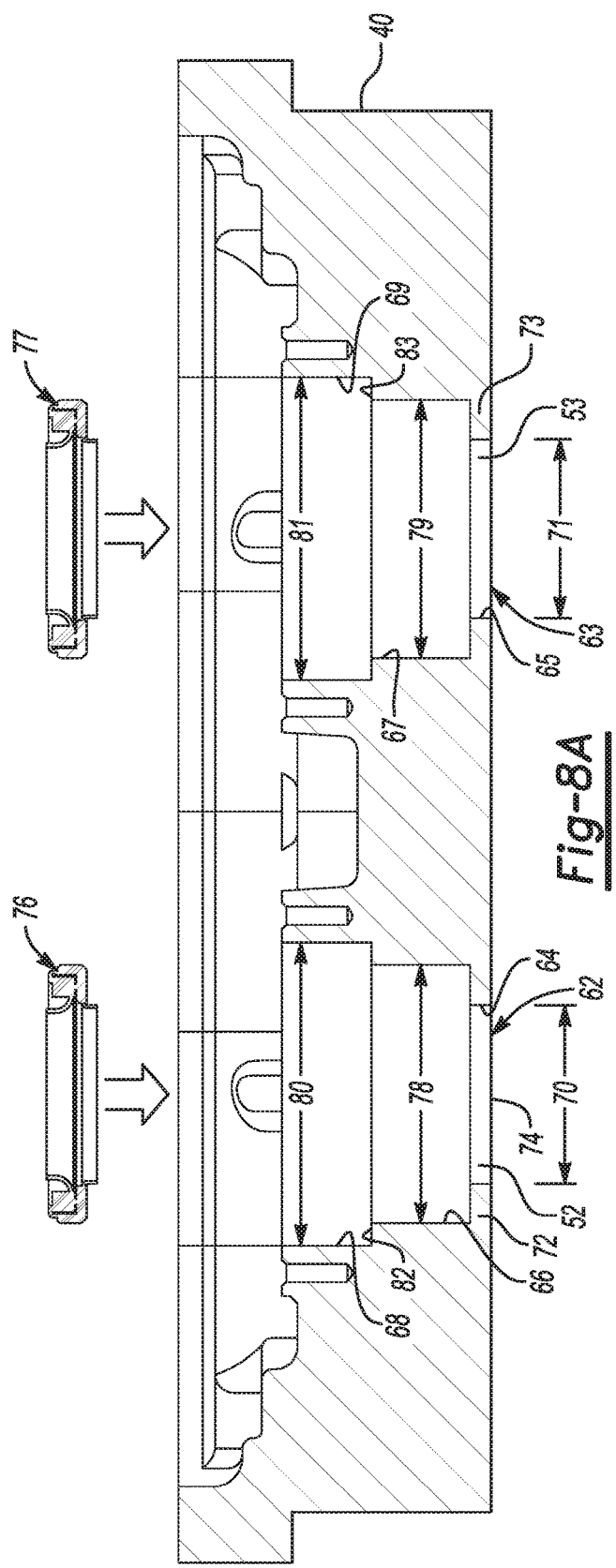
FIG. 8A and FIG. 8B are cross-sectional views together depicting an example of pressing of the driving shaft seal cartridge and the driven shaft seal cartridge into the bottom plate as disclosed herein.

Referring to FIG. 8A, note that FIG. 8A is rotated 180 degrees (inverted) compared to FIG. 7; thus FIG. 8A depicts driving side bore 52 on the left and FIG. 7 depicts driving side bore 52 on the right. The driving side bore 52 may be a driving side stepped cylindrical bore 62 having: a driving shaft clearance bore portion 64; a driving shaft seal cartridge retention bore portion 66; and a driving shaft bearing retention bore portion 68. The driving shaft clearance bore portion 64 may have a driving shaft clearance diameter 70 defined by a driving shaft seal abutment flange 72 at a driving rotor facing end 74 of the driving side bore 52, the driving shaft seal abutment flange 72 to abut a driving shaft seal cartridge 76. The driving shaft seal cartridge retention bore portion 66 may be defined in the bottom plate 40, serially adjacent to the driving shaft clearance bore portion 64, and having a driving shaft seal cartridge retention diameter 78 larger than the driving shaft clearance diameter 70 to receive the driving shaft seal cartridge 76 and prevent leakage of oil between the driving shaft seal cartridge 76 and the driving shaft seal cartridge retention bore portion 66. The driving shaft bearing retention bore portion 68 may be defined in the bottom plate 40, serially adjacent to the driving shaft seal cartridge retention bore portion 66, and having a driving shaft bearing retention diameter 80 larger than the driving shaft seal cartridge retention diameter 78, to receive the driving shaft bearing 54 (see FIG. 7).

In examples of the present disclosure, the driving shaft seal cartridge 76 and the driven shaft seal cartridge 77 are mirror images of one another, and not functionally interchangeable. The driving shaft seal cartridge 76 has an oil-side seal facing the driving timing gear 34. The oil-side seal has a spiral hydrodynamic groove that cooperates with the rotating driving shaft to pump oil toward the driving timing gear 34 and away from the driving rotor while the supercharger is operational. The driving shaft seal cartridge 76 also has an air-side seal that closely surrounds the driving shaft 29 but does not touch the driving shaft 29. The air-side seal prevents debris from fouling the oil-side seal. Since the driven shaft 42 rotates in the opposite direction relative to the driving shaft 29, the spiral hydrodynamic groove in the oil-side seal of the driven shaft seal cartridge 77 is a mirror image of the spiral hydrodynamic groove in the driving shaft seal cartridge 76. The air-side seal in the driven shaft seal cartridge 77 is interchangeable with the air-side seal of the driving shaft seal cartridge 76. Since the driving shaft seal cartridge 76 and the driven shaft seal cartridge 77 are not functionally interchangeable, the outside diameters may be detectably different to provide a poka-yoke for processing to prevent mis-installation. The driving shaft seal cartridge retention diameter 78 of the a driving shaft seal cartridge retention bore portion 66 and the driven shaft seal cartridge retention diameter 79 of the driven shaft seal cartridge retention bore portion 67 may be of different sizes to complement the outside diameters of the driving shaft seal cartridge 76 and the driven shaft seal cartridge 77.

Referring to FIGS. 8A, 8B, 9A, 9B, 10A and 10B, examples of the supercharger 12 as disclosed herein may further include a driving side spring reaction shoulder 82 defined in the bottom plate 40 at an intersection of the driving shaft seal cartridge retention bore portion 66 and the driving shaft bearing retention bore portion 68. As used herein, the intersection of the driving shaft seal cartridge retention bore portion 66 and the driving shaft bearing retention bore portion 68 means the point along the driving rotor axis 86 where the driving shaft seal cartridge retention bore portion 66 ends and the driving shaft bearing retention bore portion 68 begins. A driving side spring 84 may be disposed in the driving shaft bearing retention bore portion 68 of the driving side bore 52, between the driving side spring reaction shoulder 82 and the driving shaft bearing outer race 60, to urge the driving shaft bearing 54 axially toward the driving shaft bearing cap 58, to prevent the driving shaft bearing 54 from axially migrating upward (i.e. toward the driving rotor 43) relative to the bottom plate 40 when the driving shaft bearing 54 is subjected to axial loads from the driving shaft and rotor assembly 50 during operation of the supercharger 12 when the driving rotor axis 86 is vertical. (See FIG. 7.)

Referring primarily to FIG. 8A, the driven side bore 53 may be a driven side stepped cylindrical bore 63 having: a driven shaft clearance bore portion 65; a driven shaft seal cartridge retention bore portion 67; and a driven shaft bearing retention bore portion 69. The driven shaft clearance bore portion 65 may have a driven shaft clearance diameter 71 defined by a driven shaft seal abutment flange 73 at a driven rotor facing end 75 of the driven side bore 53, the driven shaft seal abutment flange 73 to abut a driven shaft seal cartridge 77. The driven shaft seal cartridge retention bore portion 67 may be defined in the bottom plate 40, serially adjacent to the driven shaft clearance bore portion 65, and having a driven shaft seal cartridge retention diameter 79 larger than the driven shaft clearance diameter 71 to receive the driven shaft seal cartridge 77 and prevent leakage of oil between the driven shaft seal cartridge 77 and the driven shaft seal cartridge retention bore portion 67. The driven shaft bearing retention bore portion 69 may be defined in the bottom plate 40, serially adjacent to the driven shaft seal cartridge retention bore portion 67, and having a driven shaft bearing retention diameter 81 larger than the driven shaft seal cartridge retention diameter 79, to receive the driven shaft bearing 55.

Referring to FIGS. 8A, 8B, 9A, 9B, 10A and 10B, examples of the supercharger 12, as disclosed herein, may further include a driven side spring reaction shoulder 83 defined in the bottom plate 40 at an intersection of the driven shaft seal cartridge retention bore portion 67 and the driven shaft bearing retention bore portion 69. A driven side spring 85 may be disposed in the driven shaft bearing retention bore portion 69 of the driven side bore 53, between the driven side spring reaction shoulder 83 and the driven shaft bearing outer race 61, to urge the driven shaft bearing 55 axially toward the driven shaft bearing cap 59, to prevent the driven shaft bearing 55 from axially migrating upward (i.e. toward the driven rotor 44) relative to the bottom plate 40 when the driven shaft bearing 55 is subjected to axial loads from the driven shaft and rotor assembly 51 during operation of the supercharger 12 when the driven rotor axis 87 is vertical.

Referring primarily to FIG. 6 and FIG. 7, in examples of the present disclosure, a rotating group 15 for a supercharger 12 includes a driving shaft and rotor assembly 50 including a driving shaft 29 fixedly connected to a driving rotor 43 for rotation therewith. The rotating group 15 may further include a driven shaft and rotor assembly 51 including a driven shaft 42 fixedly connected to a driven rotor 44 for rotation therewith, wherein the driving rotor 43 is in intermeshing engagement with the driven rotor 44 to rotate in a pair of transversely overlapping cylindrical chambers 25, 26 defined in a rotor housing 16 of the supercharger 12 (see FIG. 4). The rotating group 15 may still further include a driving shaft bearing 54 disposed in a bottom plate 40 to radially and axially support the driving shaft 29 for rotating the driving rotor 43 in the rotor housing at a first predetermined axial location 56 of the driving rotor 43 from the bottom plate 40. The rotating group 15 may further include a driven shaft bearing 55 disposed in the bottom plate 40 to radially and axially support the driven shaft 42 for rotating the driven rotor 44 in the rotor housing 16 at a second predetermined axial location 57 of the driven rotor 44 from the bottom plate 40.

The rotating group 15 may further include the driving shaft 29 having a pulley end 24' and a timing gear end 88 distal to the pulley end 24'. The rotor housing 16 defines the pair of transversely overlapping cylindrical chambers 25, 26 with parallel cylindrical axes 27, 28 (see FIG. 4). As depicted in FIG. 5, the rotor housing 16 may have a top end 31 and a bottom end 32 distal to the top end 31, the top end 31 facing the pulley end 24'. The parallel cylindrical axes 27, 28 intersect the top end 31 and the bottom end 32. The top end 31 and the bottom end 32 are defined with respect to the rotor housing 16 when the parallel cylindrical axes 27, 28 are vertical. A driving timing gear 34 is fixedly attached to the driving shaft 29 at a timing gear end 88 of the driving shaft 29. A driven timing gear 35 is meshingly engaged with the driving timing gear 34 at the bottom end 32 of the rotor housing 16. The bottom plate 40 may be disposed at a predetermined distance from a bottom face 89 of the driving rotor 43. The bottom plate 40 defines a driving side bore 52 and a driven side bore 53.

In examples, the rotating group 15 may further include a driving shaft bearing cap 58 attached to the bottom plate 40 in contact with a driving shaft bearing outer race 60 to prevent downward axial movement of the driving shaft bearing 54 relative to the bottom plate 40 when the driving shaft bearing 54 is subjected to axial loads from the driving shaft and rotor assembly 50 during operation of the driving rotor 43 when the driving rotor axis 86 is vertical. The rotating group 15 may still further include a driven shaft bearing cap 59 attached to the bottom plate 40 in contact with a driven shaft bearing outer race 61 to prevent downward axial movement of the driven shaft bearing 55 relative to the bottom plate 40 when the driven shaft bearing 55 is subjected to axial loads from the driven shaft and rotor assembly 51 during operation of the driven rotor 44 when the driven rotor axis 87 is vertical.

Referring primarily to FIG. 8A, in examples of the rotating group 15 of the present disclosure, the driving side bore 52 may be a driving side stepped cylindrical bore 62 having: a driving shaft clearance bore portion 64; a driving shaft seal cartridge retention bore portion 66; and a driving shaft bearing retention bore portion 68. The driving shaft clearance bore portion 64 may have a driving shaft clearance diameter 70 defined by a driving shaft seal abutment flange 72 at a driving rotor facing end 74 of the driving side bore 52. The driving shaft seal abutment flange 72 is to abut a driving shaft seal cartridge 76. The driving shaft seal cartridge retention bore portion 66 may be defined in the bottom plate 40, serially adjacent to the driving shaft clearance bore portion 64, and having a driving shaft seal cartridge retention diameter 78 larger than the driving shaft clearance diameter 70 to receive the driving shaft seal cartridge 76 and prevent leakage of oil between the driving shaft seal cartridge 76 and the driving shaft seal cartridge retention bore portion 66. The driving shaft bearing retention bore portion 68 may be defined in the bottom plate 40, serially adjacent to the driving shaft seal cartridge retention bore portion 66, and having a driving shaft bearing retention diameter 80 larger than the driving shaft seal cartridge retention diameter 78, to receive the driving shaft bearing 54.

Referring to FIGS. 8A, 8B, 9A, 9B, 10A and 10B, examples of the rotating group 15, as disclosed herein, may further include a driving side spring reaction shoulder 82 defined in the bottom plate 40 at an intersection of the driving shaft seal cartridge retention bore portion 66 and the driving shaft bearing retention bore portion 68. A driving side spring 84 may be disposed in the driving shaft bearing retention bore portion 68 of the driving side bore 52, between the driving side spring reaction shoulder 82 and the driving shaft bearing outer race 60, to urge the driving shaft bearing 54 axially toward the driving shaft bearing cap 58, to prevent the driving shaft bearing 54 from axially migrating upward (i.e. toward the driving rotor 43) relative to the bottom plate 40 when the driving shaft bearing 54 is subjected to axial loads from the driving shaft and rotor assembly 50 during operation of the rotating group 15 when the driving rotor axis 86 is vertical.

Referring primarily to FIG. 8A, in examples of the rotating group 15 of the present disclosure, the driven side bore 53 may be a driven side stepped cylindrical bore 63 having: a driven shaft clearance bore portion 65; a driven shaft seal cartridge retention bore portion 67; and a driven shaft bearing retention bore portion 69. The driven shaft clearance bore portion 65 may have a driven shaft clearance diameter 71 defined by a driven shaft seal abutment flange 73 at a driven rotor facing end 75 of the driven side bore 53. The driven shaft seal abutment flange 73 is to abut a driven shaft seal cartridge 77. The driven shaft seal cartridge retention bore portion 67 may be defined in the bottom plate 40, serially adjacent to the driven shaft clearance bore portion 65, and having a driven shaft seal cartridge retention diameter 79 larger than the driven shaft clearance diameter 71 to receive the driven shaft seal cartridge 77 and prevent leakage of oil between the driven shaft seal cartridge 77 and the driven shaft seal cartridge retention bore portion 67. The driven shaft bearing retention bore portion 69 may be defined in the bottom plate 40, serially adjacent to the driven shaft seal cartridge retention bore portion 67, and having a driven shaft bearing retention diameter 81 larger than the driven shaft seal cartridge retention diameter 79, to receive the driven shaft bearing 55.

Referring to FIGS. 8A, 8B, 9A, 9B, 10A and 10B, examples of the rotating group 15 as disclosed herein may further include a driven side spring reaction shoulder 83 defined in the bottom plate 40 at an intersection of the driven shaft seal cartridge retention bore portion 67 and the driven shaft bearing retention bore portion 69. A driven side spring 85 may be disposed in the driven shaft bearing retention bore portion 69 of the driven side bore 53, between the driven side spring reaction shoulder 83 and the driven shaft bearing outer race 61, to urge the driven shaft bearing 55 axially toward the driven shaft bearing cap, to prevent the driven shaft bearing 55 from axially migrating upward (i.e. toward the driven rotor 44) relative to the bottom plate 40 when the driven shaft bearing 55 is subjected to axial loads from the driven shaft and rotor assembly 51 during operation of the rotating group 15 when the driven rotor axis 87 is vertical.

FIGS. 8A, 8B, 9A, 9B, 10A, 10B, 11, and 12 are cross-sectional side views depicting examples of steps in a method of assembling the rotating group 15 in the supercharger 12 according to the present disclosure. The elements depicted in FIGS. 8A, 8B, 9A, 9B, 10A, 10B and 11 are shown rotated 180 degrees from the orientation of the same elements depicted in FIG. 12. It is to be understood that the rotating group 15 and the supercharger 12 may be assembled in any convenient orientation, including, for example, as shown in the FIGS., or rotated 90 degrees, or 180 degrees.

Figure 8B:
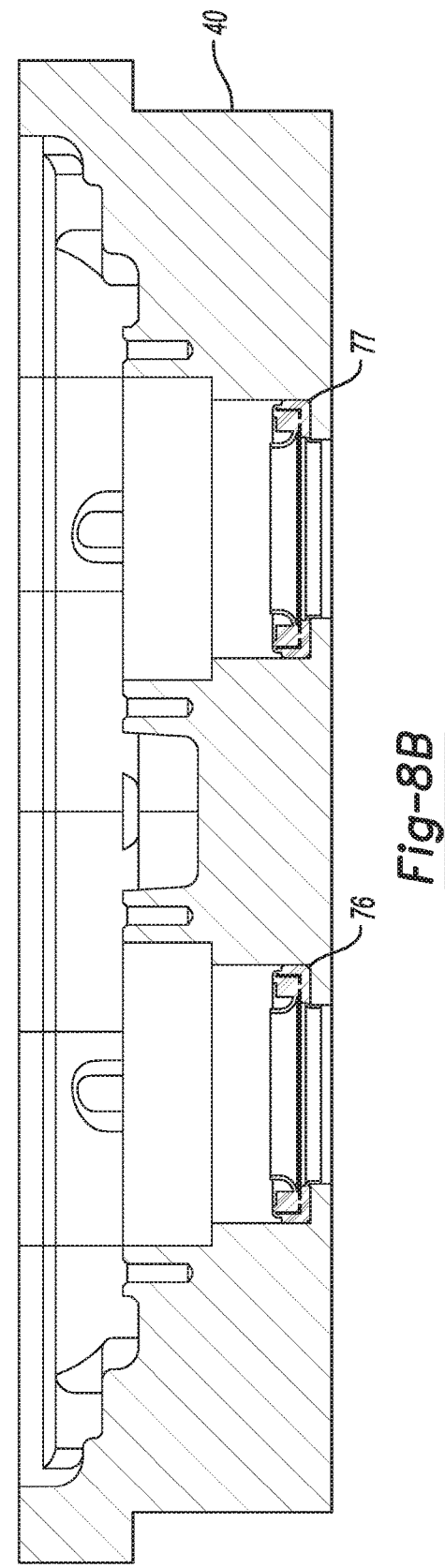

FIG. 8A and FIG. 8B together are cross-sectional views depicting pressing of the driving shaft seal cartridge 76 and the driven shaft seal cartridge 77 into the bottom plate 40. The driving shaft seal cartridge 76 is pressed into the driving shaft seal cartridge retention bore portion 66 to contact the driving shaft seal abutment flange 72. The driven shaft seal cartridge 77 is pressed into the driven shaft seal cartridge retention bore portion 67 to contact the driven shaft seal abutment flange 73.

FIG. 9A and FIG. 9B together are cross-sectional views depicting inserting of the driving side spring 84 and the driven side spring 85 into the bottom plate 40. The driving side spring 84 is inserted into the driving shaft bearing retention bore portion 68 to contact the driving side spring reaction shoulder 82. The driven side spring 85 is inserted into the driven shaft bearing retention bore portion 69 to contact the driven side spring reaction shoulder 83. It is to be understood that the driving side spring 84 and the driven side spring 85 may be interchangeable, and may be inserted with either side contacting the respective spring reaction shoulder 82, 83.

Figure 10A:
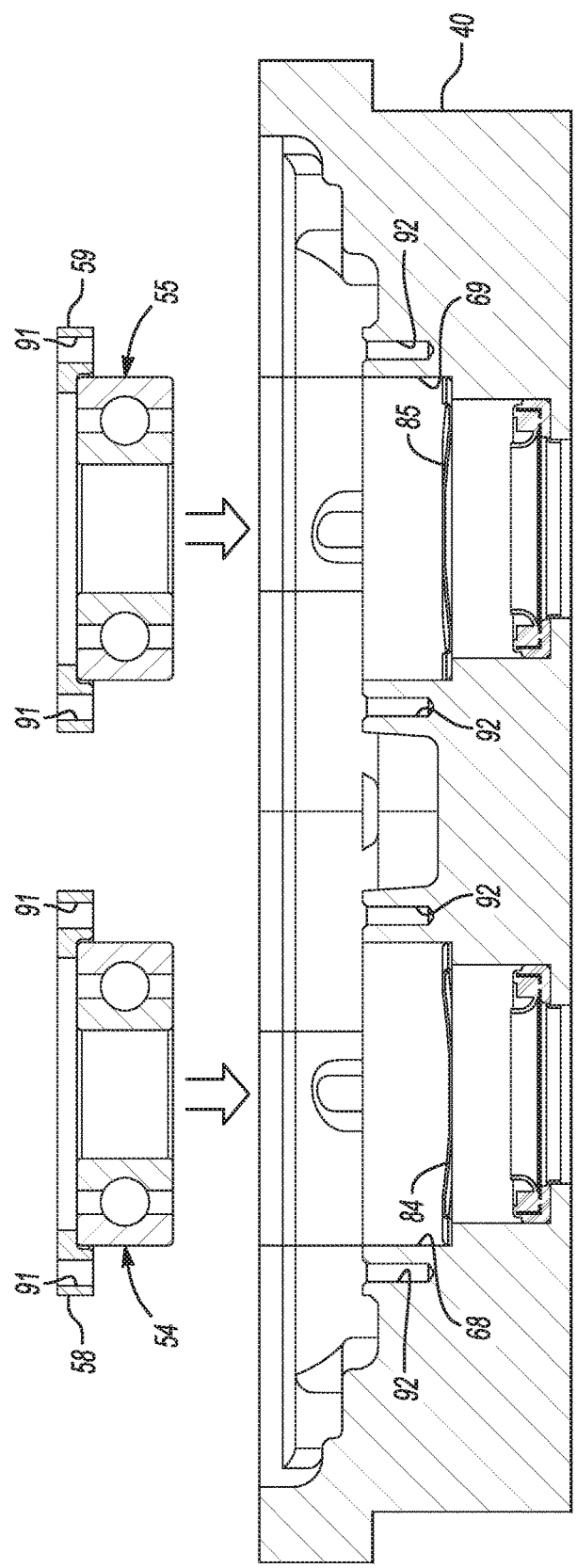
FIG. 10A and FIG. 10B together are cross-sectional views depicting installing of the driving shaft bearing cap, the driving shaft bearing, the driven shaft bearing cap, and the driven shaft bearing in the bottom plate.
Figure 10B:
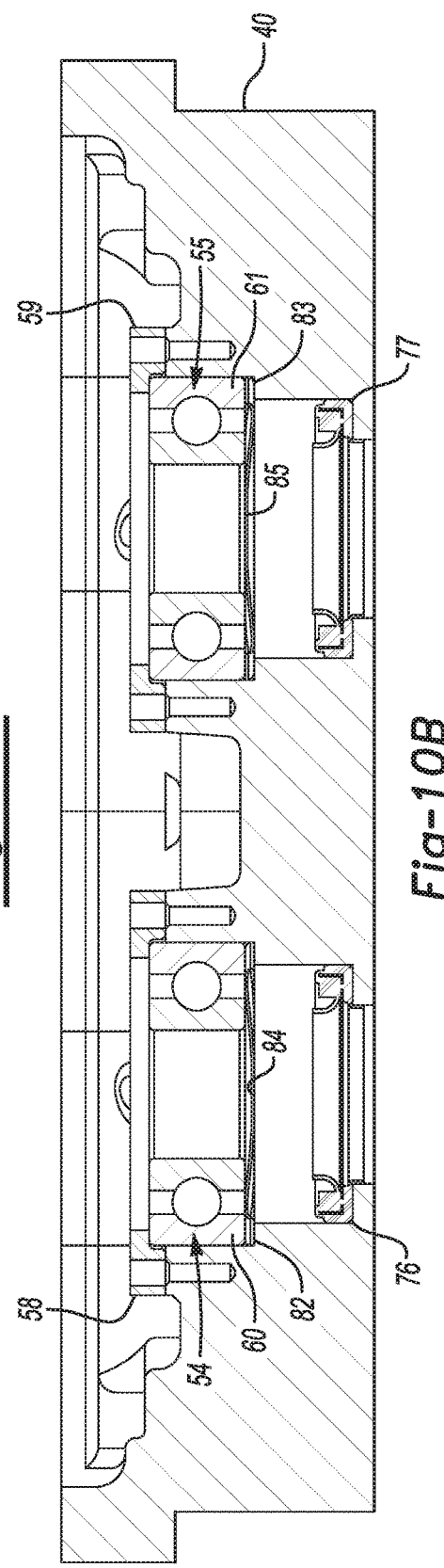

FIG. 10A and FIG. 10B together are cross-sectional views depicting installing of the driving shaft bearing cap 58, the driving shaft bearing 54, the driven shaft bearing cap 59, and the driven shaft bearing 55 in the bottom plate 40. The driving shaft bearing cap 58 is placed on the driving shaft bearing 54 and the driving shaft bearing cap 58 and the driving shaft bearing 54 are pressed together, pressing the driving shaft bearing 54 into the driving shaft bearing retention bore portion 68 until the driving shaft bearing cap 58 contacts the bottom plate 40. The driven shaft bearing cap 59 is placed on the driven shaft bearing 55 and the driven shaft bearing cap 59 and the driven shaft bearing 55 are pressed together, pressing the driven shaft bearing 55 into the driven shaft bearing retention bore portion 69 until the driven shaft bearing cap 59 contacts the bottom plate 40.

FIG. 11 is a cross-sectional view depicting installation of bearing cap retention bolts. The driving shaft bearing cap 58 and the driven shaft bearing cap 59 are rotated, if necessary, to align the flange holes 91 with the threaded holes 92. Bearing cap retention bolts 93 are installed through the flange holes 91 into the threaded holes 92; and torqued to a predetermined torque. In examples, the bearing cap retention bolts 93 may have a threadlocking patch (e.g., Loctite® 204) disposed on a threaded surface of the bearing cap retention bolts 93. In other examples, a threadlocking compound (e.g., Loctite® 266) may be applied to the threads of the bearing cap retention bolts 93 prior to installation of the bearing cap retention bolts 93 through the flange holes 91 into the threaded holes 92.

Figure 12:
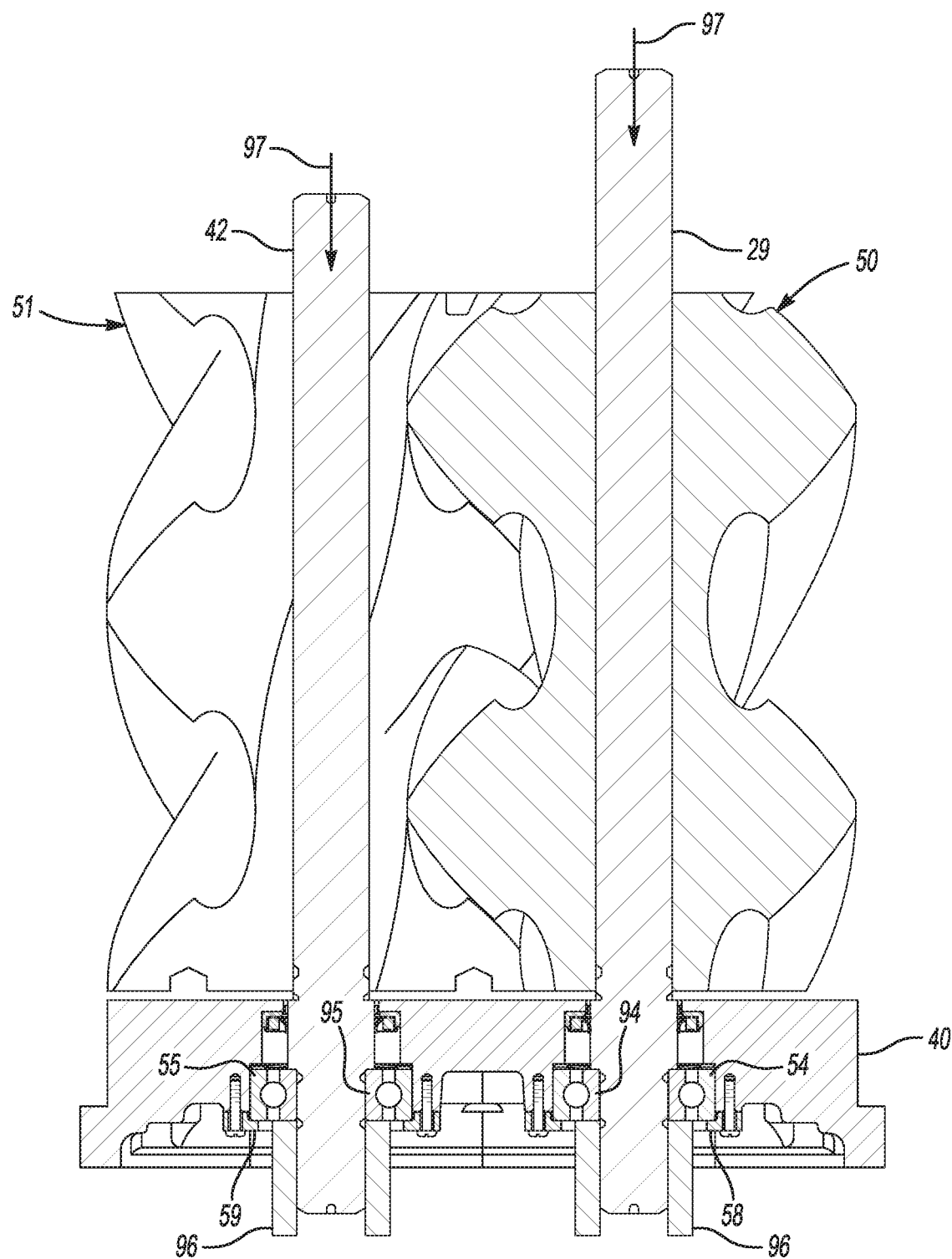
FIG. 12 is a cross-sectional view depicting installation of the driving shaft and rotor assembly, and the driven shaft and rotor assembly.

FIG. 12 is a cross-sectional view depicting installation of the driving shaft and rotor assembly 50 and the driven shaft and rotor assembly 51. The driving shaft and rotor assembly 50 is installed by pressing the driving shaft 29 into the driving shaft bearing 54 while supporting the driving shaft bearing inner race 94, with, e.g., a cylindrical bearing support tool 96. The driven shaft and rotor assembly 51 is installed by pressing the driven shaft 42 into the driven shaft bearing 55 while supporting the driven shaft bearing inner race 95, with, e.g., the cylindrical bearing support tool 96. In FIG. 12, arrows 97 indicate the pressing force applied to the driving shaft 29 and the driven shaft 42.

After the driving shaft and rotor assembly 50 and the driven shaft and rotor assembly 51 are installed, the driving rotor 43 and the driven rotor 44 are rotated and held in a proper intermeshing timing relationship. Then, the driving timing gear 34 is pressed onto the driving shaft 29 and the driven timing gear 35 is pressed onto the driven shaft 42 simultaneously with the timing gear teeth meshed. FIG. 7 depicts the driving timing gear 34 and the driven timing gear 35 installed.

Although the supercharger 12 is described with rotating components rotating in a particular direction, it is to be understood that rotating components in the opposite direction, with appropriate changes to configuration such as a spiral direction of each of the rotors, is also disclosed herein.

It is to be understood that use of the words "a" and "an" and other singular referents may include plural as well, both in the specification and claims, unless the context clearly indicates otherwise.

Further, it is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples can be modified. Therefore, the foregoing description is to be considered non-limiting.

What is claimed is:

1. A rotating group for a supercharger, comprising:
a driving shaft and rotor assembly including a driving shaft fixedly connected to a driving rotor for rotation therewith,
a driven shaft and rotor assembly including a driven shaft fixedly connected to a driven rotor for rotation therewith, wherein the driving rotor is in intermeshing engagement with the driven rotor to rotate in a pair of transversely overlapping cylindrical chambers defined in a rotor housing of the supercharger, bottom plate disposed at a bottom end of the rotor housing, the bottom plate defining a driving side bore and a driven side bore;
a driving shaft bearing disposed in the driving side bore to radially and axially support the driving shaft for rotating the driving rotor in the rotor housing at a first predetermined axial location of the driving rotor from the bottom plate; and
a driven shaft bearing disposed in the driven side bore to radially and axially support the driven shaft for rotating the driven rotor in the rotor housing at a second predetermined axial location of the driven rotor from the bottom plate.

2. The rotating group as defined in claim 1, further comprising:
the driving shaft having a pulley end and a timing gear end distal to the pulley end, wherein the rotor housing defines the pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical;
a driving timing gear fixedly attached to the driving shaft at the timing gear end of the driving shaft;
a driven timing gear meshingly engaged with the driving timing gear at the bottom end of the rotor housing; and
the bottom plate disposed at a predetermined distance from a bottom face of the driving rotor, the bottom plate defining a driving side bore and a driven side bore.

3. The rotating group as defined in claim 2, further comprising:
a driving shaft bearing cap attached to the bottom plate in contact with a driving shaft bearing outer race to prevent downward axial movement of the driving shaft bearing relative to the bottom plate when the driving shaft bearing is subjected to axial loads from the driving shaft and rotor assembly during operation of the driving rotor when a driving rotor axis is vertical; and
a driven shaft bearing cap attached to the bottom plate in contact with a driven shaft bearing outer race to prevent downward axial movement of the driven shaft bearing relative to the bottom plate when the driven shaft bearing is subjected to axial loads from the driven shaft and rotor assembly during operation of the driven rotor when a driven rotor axis is vertical.

4. A rotating group for a supercharger, comprising:
a driving shaft and rotor assembly including a driving shaft fixedly connected to a driving rotor for rotation therewith,
a driven shaft and rotor assembly including a driven shaft fixedly connected to a driven rotor for rotation therewith, wherein the driving rotor is in intermeshing engagement with the driven rotor to rotate in a pair of transversely overlapping cylindrical chambers defined in a rotor housing of the supercharger,
a driving shaft bearing disposed in a bottom plate to radially and axially support the driving shaft for rotating the driving rotor in the rotor housing at a first predetermined axial location of the driving rotor from the bottom plate;
a driven shaft bearing disposed in the bottom plate to radially and axially support the driven shaft for rotating the driven rotor in the rotor housing at a second predetermined axial location of the driven rotor from the bottom plate;
the driving shaft having a pulley end and a timing gear end distal to the pulley end, wherein the rotor housing defines the pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical;
a driving timing gear fixedly attached to the driving shaft at the timing gear end of the driving shaft;
a driven timing gear meshingly engaged with the driving timing gear at the bottom end of the rotor housing;
the bottom plate disposed at a predetermined distance from a bottom face of the driving rotor, the bottom plate defining a driving side bore and a driven side bore;
a driving shaft bearing cap attached to the bottom plate in contact with a driving shaft bearing outer race to prevent downward axial movement of the driving shaft bearing relative to the bottom plate when the driving shaft bearing is subjected to axial loads from the driving shaft and rotor assembly during operation of the driving rotor when a driving rotor axis is vertical; and
a driven shaft bearing cap attached to the bottom plate in contact with a driven shaft bearing outer race to prevent downward axial movement of the driven shaft bearing relative to the bottom plate when the driven shaft bearing is subjected to axial loads from the driven shaft and rotor assembly during operation of the driven rotor when a driven rotor axis is vertical;
wherein the driving side bore is a driving side stepped cylindrical bore having:
a driving shaft clearance bore portion having a driving shaft clearance diameter defined by a driving shaft seal abutment flange at a driving rotor facing end of the driving side bore, the driving shaft seal abutment flange to abut a driving shaft seal cartridge;
a driving shaft seal cartridge retention bore portion defined in the bottom plate, serially adjacent to the driving shaft clearance bore portion, and having a driving shaft seal cartridge retention diameter larger than the driving shaft clearance diameter to receive the driving shaft seal cartridge and prevent leakage of oil between the driving shaft seal cartridge and the driving shaft seal cartridge retention bore portion; and a driving shaft bearing retention bore portion defined in the bottom plate, serially adjacent to the driving shaft seal cartridge retention bore portion, and having a driving shaft bearing retention diameter larger than the driving shaft seal cartridge retention diameter, to receive the driving shaft bearing.

5. The rotating group as defined in claim 4, further comprising:
a driving side spring reaction shoulder defined in the bottom plate at an intersection of the driving shaft seal cartridge retention bore portion and the driving shaft bearing retention bore portion; and
a driving side spring disposed in the driving shaft bearing retention bore portion of the driving side bore, between the driving side spring reaction shoulder and the driving shaft bearing outer race, to urge the driving shaft bearing axially toward the driving shaft bearing cap, to prevent the driving shaft bearing from axially migrating upward, toward the driving rotor, relative to the bottom plate when the driving shaft bearing is subjected to axial loads from the driving shaft and rotor assembly during operation of the rotating group when the driving rotor axis is vertical.

6. The rotating group as defined in claim 4 wherein:
the driven side bore is a driven side stepped cylindrical bore having:
a driven shaft clearance bore portion having a driven shaft clearance diameter defined by a driven shaft seal abutment flange at a driven rotor facing end of the driven side bore, the driven shaft seal abutment flange to abut a driven shaft seal cartridge;
a driven shaft seal cartridge retention bore portion defined in the bottom plate, serially adjacent to the driven shaft clearance bore portion, and having a driven shaft seal cartridge retention diameter larger than the driven shaft clearance diameter to receive the driven shaft seal cartridge and prevent leakage of oil between the driven shaft seal cartridge and the driven shaft seal cartridge retention bore portion; and
a driven shaft bearing retention bore portion defined in the bottom plate, serially adjacent to the driven shaft seal cartridge retention bore portion, and having a driven shaft bearing retention diameter larger than the driven shaft seal cartridge retention diameter, to receive the driven shaft bearing.

7. The rotating group as defined in claim 6, further comprising:
a driven side spring reaction shoulder defined in the bottom plate at an intersection of the driven shaft seal cartridge retention bore portion and the driven shaft bearing retention bore portion; and
a driven side spring disposed in the driven shaft bearing retention bore portion of the driven side bore, between the driven side spring reaction shoulder and the driven shaft bearing outer race, to urge the driven shaft bearing axially toward the driven shaft bearing cap, to prevent the driven shaft bearing from axially migrating upward, toward the driven rotor, relative to the bottom plate when the driven shaft bearing is subjected to axial loads from the driven shaft and rotor assembly during operation of the rotating group when the driven rotor axis is vertical.

8. A supercharger, comprising:
a supercharger drive pulley established at a pulley end of the supercharger, the supercharger drive pulley connected to a driving shaft for rotation therewith, the supercharger drive pulley to be rotated about a vertical axis by a connection to a top-mounted crankshaft pulley of a vertical crankshaft engine;
a rotor housing defining a pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical;
an air intake opening defined in the rotor housing at the top end;
a driving timing gear fixedly attached to the driving shaft at the timing gear end of the driving shaft; and
a driven timing gear meshingly engaged with the driving timing gear at the bottom end of the rotor housing.

9. The supercharger as defined in claim 8, further comprising:
a driving shaft and rotor assembly including a driving shaft fixedly connected to a driving rotor for rotation therewith;
a driven shaft and rotor assembly including a driven shaft fixedly connected to a driven rotor for rotation therewith, wherein the driving rotor is in intermeshing engagement with the driven rotor to rotate in the pair of transversely overlapping cylindrical chambers;
a bottom plate disposed at the bottom end of the rotor housing, the bottom plate defining a driving side bore and a driven side bore;
a driving shaft bearing disposed in the driving side bore to radially and axially support the driving shaft for rotating the driving rotor in the rotor housing at a first predetermined axial location of the driving rotor in the rotor housing; and
a driven shaft bearing disposed in the driven side bore to radially and axially support the driven shaft for rotating the driven rotor in the rotor housing at a second predetermined axial location of the driven rotor in the rotor housing.

10. The supercharger as defined in claim 9, further comprising:
a driving shaft bearing cap attached to the bottom plate in contact with a driving shaft bearing outer race to prevent downward axial movement of the driving shaft bearing relative to the bottom plate when the driving shaft bearing is subjected to axial loads from the driving shaft and rotor assembly during operation of the supercharger when a driving rotor axis is vertical; and
a driven shaft bearing cap attached to the bottom plate in contact with a driven shaft bearing outer race to prevent downward axial movement of the driven shaft bearing relative to the bottom plate when the driven shaft bearing is subjected to axial loads from the driven shaft and rotor assembly during operation of the supercharger when a driven rotor axis is vertical.

11. A supercharger, comprising:
a supercharger drive pulley established at a pulley end of the supercharger, the supercharger drive pulley connected to a driving shaft for rotation therewith, the supercharger drive pulley to be rotated about a vertical axis by a connection to a top-mounted crankshaft pulley of a vertical crankshaft engine;

a rotor housing defining a pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical;

an air intake opening defined in the rotor housing at the top end;

a driving timing gear fixedly attached to the driving shaft at the timing gear end of the driving shaft;

a driven timing gear meshingly engaged with the driving timing gear at the bottom end of the rotor housing;

a driving shaft and rotor assembly including a driving shaft fixedly connected to a driving rotor for rotation therewith;

a driven shaft and rotor assembly including a driven shaft fixedly connected to a driven rotor for rotation therewith, wherein the driving rotor is in intermeshing engagement with the driven rotor to rotate in the pair of transversely overlapping cylindrical chambers;

a bottom plate disposed at the bottom end of the rotor housing, the bottom plate defining a driving side bore and a driven side bore;

a driving shaft bearing disposed in the driving side bore to radially and axially support the driving shaft for rotating the driving rotor in the rotor housing at a first predetermined axial location of the driving rotor in the rotor housing;

a driven shaft bearing disposed in the driven side bore to radially and axially support the driven shaft for rotating the driven rotor in the rotor housing at a second predetermined axial location of the driven rotor in the rotor housing;

a driving shaft bearing cap attached to the bottom plate in contact with a driving shaft bearing outer race to prevent downward axial movement of the driving shaft bearing relative to the bottom plate when the driving shaft bearing is subjected to axial loads from the driving shaft and rotor assembly during operation of the supercharger when a driving rotor axis is vertical; and a driven shaft bearing cap attached to the bottom plate in contact with a driven shaft bearing outer race to prevent downward axial movement of the driven shaft bearing relative to the bottom plate when the driven shaft bearing is subjected to axial loads from the driven shaft and rotor assembly during operation of the supercharger when a driven rotor axis is vertical;

wherein the driving side bore is a driving side stepped cylindrical bore having:
  a driving shaft clearance bore portion having a driving shaft clearance diameter defined by a driving shaft seal abutment flange at a driving rotor facing end of the driving side bore, the driving shaft seal abutment flange to abut a driving shaft seal cartridge;
  a driving shaft seal cartridge retention bore portion defined in the bottom plate, serially adjacent to the driving shaft clearance bore portion, and having a driving shaft seal cartridge retention diameter larger than the driving shaft clearance diameter to receive the driving shaft seal cartridge and prevent leakage of oil between the driving shaft seal cartridge and the driving shaft seal cartridge retention bore portion; and
  a driving shaft bearing retention bore portion defined in the bottom plate, serially adjacent to the driving shaft seal cartridge retention bore portion, and having a driving shaft bearing retention diameter larger than the driving shaft seal cartridge retention diameter, to receive the driving shaft bearing.

12. The supercharger as defined in claim 11, further comprising:
  a driving side spring reaction shoulder defined in the bottom plate at an intersection of the driving shaft seal cartridge retention bore portion and the driving shaft bearing retention bore portion; and
  a driving side spring disposed in the driving shaft bearing retention bore portion of the driving side bore, between the driving side spring reaction shoulder and the driving shaft bearing outer race, to urge the driving shaft bearing axially toward the driving shaft bearing cap, to prevent the driving shaft bearing from axially migrating upward, toward the driving rotor, relative to the bottom plate when the driving shaft bearing is subjected to axial loads from the driving shaft and rotor assembly during operation of the supercharger when the driving rotor axis is vertical.

13. The supercharger as defined in claim 11 wherein:
the driven side bore is a driven side stepped cylindrical bore having:
  a driven shaft clearance bore portion having a driven shaft clearance diameter defined by a driven shaft seal abutment flange at a driven rotor facing end of the driven side bore, the driven shaft seal abutment flange to abut a driven shaft seal cartridge;
  a driven shaft seal cartridge retention bore portion defined in the bottom plate, serially adjacent to the driven shaft clearance bore portion, and having a driven shaft seal cartridge retention diameter larger than the driven shaft clearance diameter to receive the driven shaft seal cartridge and prevent leakage of oil between the driven shaft seal cartridge and the driven shaft seal cartridge retention bore portion; and
  a driven shaft bearing retention bore portion defined in the bottom plate, serially adjacent to the driven shaft seal cartridge retention bore portion, and having a driven shaft bearing retention diameter larger than the driven shaft seal cartridge retention diameter, to receive the driven shaft bearing.

14. The supercharger as defined in claim 13, further comprising:
  a driven side spring reaction shoulder defined in the bottom plate at an intersection of the driven shaft seal cartridge retention bore portion and the driven shaft bearing retention bore portion; and
  a driven side spring disposed in the driven shaft bearing retention bore portion of the driven side bore, between the driven side spring reaction shoulder and the driven shaft bearing outer race, to urge the driven shaft bearing axially toward the driven shaft bearing cspap, to prevent the driven shaft bearing from axially migrating upward, toward the driven rotor, when the driven shaft bearing is subjected to axial loads from the driven shaft and rotor assembly during operation of the supercharger when the driven rotor axis is vertical.

15. A rotating group for a positive displacement pump, comprising:
  a driving shaft and rotor assembly including a driving shaft fixedly connected to a driving rotor for rotation therewith,
  a driven shaft and rotor assembly including a driven shaft fixedly connected to a driven rotor for rotation therewith, wherein the driving rotor is in intermeshing engagement with the driven rotor to rotate in a pair of transversely overlapping cylindrical chambers defined in a rotor housing of the positive displacement pump, a bottom plate disposed at a bottom end of the rotor housing, the bottom plate defining a driving side bore and a driven side bore;

a driving shaft bearing disposed in the driving side bore to radially and axially support the driving shaft for rotating the driving rotor in the rotor housing at a first predetermined axial location of the driving rotor from the bottom plate; and a driven shaft bearing disposed in the driven side bore to radially and axially support the driven shaft for rotating the driven rotor in the rotor housing at a second predetermined axial location of the driven rotor from the bottom plate.

16. The rotating group as defined in claim 15, further comprising:

the driving shaft having a pulley end and a timing gear end distal to the pulley end, wherein the rotor housing defines the pair of transversely overlapping cylindrical chambers with parallel cylindrical axes, the rotor housing having a top end and a bottom end distal to the top end, the top end facing the pulley end, wherein the parallel cylindrical axes intersect the top end and the bottom end, wherein the top end and the bottom end are defined with respect to the rotor housing when the parallel cylindrical axes are vertical;

a driving timing gear fixedly attached to the driving shaft at the timing gear end of the driving shaft;

a driven timing gear meshingly engaged with the driving timing gear at the bottom end of the rotor housing;

the bottom plate disposed at a predetermined distance from a bottom face of the driving rotor;

a driving shaft bearing cap attached to the bottom plate in contact with a driving shaft bearing outer race to prevent downward axial movement of the driving shaft bearing relative to the bottom plate when the driving shaft bearing is subjected to axial loads from the driving shaft and rotor assembly during operation of the driving rotor when a driving rotor axis is vertical; and a driven shaft bearing cap attached to the bottom plate in contact with a driven shaft bearing outer race to prevent downward axial movement of the driven shaft bearing relative to the bottom plate when the driven shaft bearing is subjected to axial loads from the driven shaft and rotor assembly during operation of the driven rotor when a driven rotor axis is vertical.

17. The rotating group as defined in claim 16 wherein the driving side bore is a driving side stepped cylindrical bore having:

a driving shaft clearance bore portion having a driving shaft clearance diameter defined by a driving shaft seal abutment flange at a driving rotor facing end of the driving side bore, the driving shaft seal abutment flange to abut a driving shaft seal cartridge;

a driving shaft seal cartridge retention bore portion defined in the bottom plate, serially adjacent to the driving shaft clearance bore portion, and having a driving shaft seal cartridge retention diameter larger than the driving shaft clearance diameter to receive the driving shaft seal cartridge and prevent leakage of oil between the driving shaft seal cartridge and the driving shaft seal cartridge retention bore portion; and a driving shaft bearing retention bore portion defined in the bottom plate, serially adjacent to the driving shaft seal cartridge retention bore portion, and having a driving shaft bearing retention diameter larger than the driving shaft seal cartridge retention diameter, to receive the driving shaft bearing.

18. The rotating group as defined in claim 17, further comprising:

a driving side spring reaction shoulder defined in the bottom plate at an intersection of the driving shaft seal cartridge retention bore portion and the driving shaft bearing retention bore portion; and a driving side spring disposed in the driving shaft bearing retention bore portion of the driving side bore, between the driving side spring reaction shoulder and the driving shaft bearing outer race, to urge the driving shaft bearing axially toward the driving shaft bearing cap, to prevent the driving shaft bearing from axially migrating upward, toward the driving rotor, relative to the bottom plate when the driving shaft bearing is subjected to axial loads from the driving shaft and rotor assembly during operation of the rotating group when the driving rotor axis is vertical.

19. The rotating group as defined in claim 17 wherein the driven side bore is a driven side stepped cylindrical bore having:

a driven shaft clearance bore portion having a driven shaft clearance diameter defined by a driven shaft seal abutment flange at a driven rotor facing end of the driven side bore, the driven shaft seal abutment flange to abut a driven shaft seal cartridge;

a driven shaft seal cartridge retention bore portion defined in the bottom plate, serially adjacent to the driven shaft clearance bore portion, and having a driven shaft seal cartridge retention diameter larger than the driven shaft clearance diameter to receive the driven shaft seal cartridge and prevent leakage of oil between the driven shaft seal cartridge and the driven shaft seal cartridge retention bore portion; and a driven shaft bearing retention bore portion defined in the bottom plate, serially adjacent to the driven shaft seal cartridge retention bore portion, and having a driven shaft bearing retention diameter larger than the driven shaft seal cartridge retention diameter, to receive the driven shaft bearing.

20. The rotating group as defined in claim 19, further comprising:

a driven side spring reaction shoulder defined in the bottom plate at an intersection of the driven shaft seal cartridge retention bore portion and the driven shaft bearing retention bore portion; and a driven side spring disposed in the driven shaft bearing retention bore portion of the driven side bore, between the driven side spring reaction shoulder and the driven shaft bearing outer race, to urge the driven shaft bearing axially toward the driven shaft bearing cap, to prevent the driven shaft bearing from axially migrating upward, toward the driven rotor, relative to the bottom plate when the driven shaft bearing is subjected to axial loads from the driven shaft and rotor assembly during operation of the rotating group when the driven rotor axis is vertical.

* * * * *